(12) United States Patent
Yamauchi

(10) Patent No.: US 7,317,259 B2
(45) Date of Patent: Jan. 8, 2008

(54) POWER OUTPUT APPARATUS AND MOTOR VEHICLE EQUIPPED WITH POWER OUTPUT APPARATUS

(75) Inventor: Tomokazu Yamauchi, Toyota (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 18 days.

(21) Appl. No.: 10/589,494

(22) PCT Filed: Feb. 21, 2005

(86) PCT No.: PCT/JP2005/003241

§ 371 (c)(1),
(2), (4) Date: Aug. 15, 2006

(87) PCT Pub. No.: WO2005/097537

PCT Pub. Date: Oct. 20, 2005

(65) Prior Publication Data

US 2007/0151783 A1    Jul. 5, 2007

(30) Foreign Application Priority Data

Mar. 31, 2004 (JP) .............................. 2004-107274

(51) Int. Cl.
*B60L 11/14* (2006.01)
(52) U.S. Cl. .................................................. 290/40 C
(58) Field of Classification Search ................ 290/40 C
See application file for complete search history.

(56) References Cited

U.S. PATENT DOCUMENTS

| | | | | |
|---|---|---|---|---|
| 3,591,847 A | * | 7/1971 | Donnell et al. | 307/37 |
| 4,392,393 A | * | 7/1983 | Montgomery | 74/661 |
| 6,177,738 B1 | * | 1/2001 | Hentunen et al. | 307/67 |
| 6,306,056 B1 | * | 10/2001 | Moore | 475/5 |
| 6,814,686 B2 | * | 11/2004 | Carriere et al. | 477/6 |
| 6,852,062 B1 | * | 2/2005 | Ahner et al. | 477/2 |
| 2003/0037978 A1 | * | 2/2003 | Hofbauer | 180/65.4 |
| 2007/0243966 A1 | * | 10/2007 | Holmes et al. | 475/5 |

FOREIGN PATENT DOCUMENTS

| | | |
|---|---|---|
| JP | 10-023606 A | 1/1998 |
| JP | 11-311137 A | 11/1999 |
| JP | 2000-265910 A | 9/2000 |
| JP | 2003-505291 A * | 2/2003 |

* cited by examiner

Primary Examiner—Joseph Waks
(74) Attorney, Agent, or Firm—Kenyon & Kenyon LLP

(57) ABSTRACT

A motor (MG1) is connected to a sun gear (31) of a first planetary gear (P1) of a power distribution/unification mechanism (30), an engine (EG1) is connected to a carrier (34) of the first planetary gear (P1) and a ring gear (37) of a second planetary gear (P2), an engine (EG2) is connected to a ring gear (32) of the first planetary gear (P1) and a carrier (39) of the second planetary gear (P2), and a motor (MG2) and a drive shaft (65) are connected to a sun gear (36) of the second planetary gear (P2). Drive control is made by selecting an operation pattern from the following operation patterns, the operation pattern to be selected is the pattern enabling efficient operation according to a demand by an operator: a first operation pattern where power is outputted from the engine (EG2) to the drive shaft (65), a second operation pattern where power is outputted from the engine (EG1) to the drive shaft (65), a third operation pattern where power is outputted from both engines (EG1, EG2) to the drive shaft (65), and a motor operation mode where the engines (EG1, EG2) are stopped and power is outputted from the motor (MG2) to the drive shaft (65).

14 Claims, 19 Drawing Sheets

Fig. 12

| 1 | 2 | 3 | 4 | 5 |
|---|---|---|---|---|
| EG | EG | EG | EG | EG |
| EG | EG | MG * | MG | MG |
| MG * | MG | EG | EG | MG * |
| MG | MG * | MG | MG * | EG |

Fig. 20

| 1 | 2 | 3 | 4 | 5 |
|---|---|---|---|---|
| EG * | EG | EG | EG * | MG |
| EG | EG * | MG | MG | EG * |
| MG | MG | EG * | MG | EG |
| MG | MG | MG | EG | MG |

POWER OUTPUT APPARATUS AND MOTOR VEHICLE EQUIPPED WITH POWER OUTPUT APPARATUS

This is a 371 national phase application of PCT/JP2005/003241 filed 21 Feb. 2005, claiming priority to Japanese Patent Application No. 2004-107274 filed 31 Mar. 2004. the contents of which are incorporated herein by reference.

TECHNICAL FIELD

The present invention relates to a power output apparatus and a motor vehicle equipped with the power output apparatus. More specifically the invention pertains to a power output apparatus that outputs power to a driveshaft, as well as a motor vehicle that is equipped with the power output apparatus.

BACKGROUND ART

One proposed power output apparatus mounted on a motor vehicle has two structure configurations, in each of which an engine is connected to a rotating shaft of a motor via a clutch. In this prior art power output apparatus, an actuator unit is attached to a transmission linked with an axle of the motor vehicle, and the two structure configurations are connected to the actuator unit via respective clutches and brakes (see, for example, Japanese Patent Laid-Open Gazette No. H11-311137). Appropriate coupling and release of the clutches and the brakes and the operations of the engines at efficient drive points in various combinations of the two motors and two engines are expected to increase the overall energy efficiency of the whole motor vehicle.

DISCLOSURE OF THE INVENTION

In the prior art power output apparatus, due to the characteristics of the actuator unit, while the engine in one structure configuration is operated at an efficient drive point, the engine in the other structure configuration is driven to output a cancellation torque for canceling out a reactive force of the engine power and to have a rotation speed defined by the rotation speed of an output shaft of the engine linked with the transmission and the rotation speed of the engine in one structure configuration. Namely the engine in the other structure configuration is not allowed to be driven at an efficient drive point. In this prior art power output apparatus, there is only a low degree of freedom in operations of the two engines.

Power output apparatuses of various different constructions have been mounted on diversity of latest motor vehicles, for example, motor-driven electric vehicles, hybrid vehicles equipped with both an engine and a motor, and fuel cell vehicles with a stack of fuel cells. One of the primary issues with regard to such power output apparatuses is enhancement of energy efficiency.

The invention regards a power output apparatus with two motors and two internal combustion engines, as well as a motor vehicle equipped with the power output apparatus. The object of the invention is to provide a structure of the power output apparatus or the motor vehicle that attains a high degree of freedom in operations of the two internal combustion engines. The object of the invention is also to enhance the overall energy efficiency of the whole power output apparatus or the whole motor vehicle.

In order to attain at least part of the above and the other related objects, the power output apparatus of the invention and the motor vehicle equipped with the power output apparatus have the configurations discussed below.

The present invention is directed to a power output apparatus that outputs power to a driveshaft. The power output apparatus includes: a first internal combustion engine; a second internal combustion engine; a first motor; a second motor; and a multi-axes-type power input output mechanism that has multiple axes including four axes, that is, a first axis linked to an output shaft of the first internal combustion engine, a second axis linked to an output shaft of the second internal combustion engine, a third axis linked to a rotating shaft of the first motor, and a fourth axis linked to a rotating shaft of the second motor, where one of the four axes is connected to the driveshaft, rotations of two of the four axes depend upon rotation speeds of remaining two axes of the four axes, and at least part of powers of the first internal combustion engine, the second internal combustion engine, the first motor, and the second motor are output to the driveshaft with balance of powers input to and output from the multiple axes.

The power output apparatus of the invention has the multi-axes-type power input output mechanism, which has the multiple axes including the four axes, that is, the first axis linked to the output shaft of the first internal combustion engine, the second axis linked to the output shaft of the second internal combustion engine, the third axis linked to the rotating shaft of the first motor, and the fourth axis linked to the rotating shaft of the second motor. The driveshaft is connected with one of these four axes, and the two axes of the four axes are rotated based on the rotation speeds of the remaining two axes. The multi-axes-type power input output mechanism works to output the power to the driveshaft with balance of at least the input and output powers between these four axes and the first internal combustion engine, the second internal combustion engine, the first motor, and the second motor. Appropriate operation controls of the first internal combustion engine, the second internal combustion engine, the first motor, and the second motor desirably enhance the overall energy efficiency of the whole power output apparatus.

In the power output apparatus of the invention, the driveshaft may be connected with either one of the third axis and the fourth axis of the multi-axes-type power input output mechanism or may be connected with either one of the first axis and the second axis of the multi-axes-type power input output mechanism.

In one preferable embodiment of the power output apparatus of the invention, the multi-axes-type power input output mechanism includes a first connection-disconnection mechanism that connects and disconnects the first axis with and from the output shaft of the first internal combustion engine, and a second connection-disconnection mechanism that connects and disconnects the second axis with and from the output shaft of the second internal combustion engine. In the power output apparatus of this embodiment, adequate controls of the first connection-disconnection mechanism and the second connection-disconnection mechanism desirably increase the degree of freedom in operations of the first internal combustion engine and the second internal combustion engine. The first internal combustion engine and the second internal combustion engine may be driven at efficient drive points or may stop their operations to ensure the enhanced overall energy efficiency of the whole power output apparatus. In the power output apparatus of this preferable embodiment, at least one of the first connection-disconnection mechanism and the second connection-disconnection mechanism may be a one-way clutch. The first connection-disconnection mechanism and the second connection-disconnection mechanism then readily attain the connection or the disconnection by simple operation of the relevant internal combustion engine.

In one preferable application of the power output apparatus of the invention, the multi-axes-type power input output mechanism has the four axes arranged such that the axis connected to the driveshaft is rotated at either a maximum rotation speed or a minimum rotation speed among rotation speeds of the four axes. In another preferable application of the power output apparatus of the invention, the multi-axes-type power input output mechanism has the four axes arranged such that the axis connected to the driveshaft is rotated at neither a maximum rotation speed nor a minimum rotation speed among rotation speeds of the four axes.

In one preferable embodiment of the invention, the power output apparatus further includes: a power demand setting module that sets a power demand required for the driveshaft, in response to an operator's operation; and a control module that controls the first internal combustion engine, the second internal combustion engine, the first motor, the second motor, and the multi-axes-type power input output mechanism to output a power equivalent to the set power demand to the driveshaft. This arrangement ensures output of the required power to the driveshaft in response to the operator's operation. The control module may control the first internal combustion engine, the second internal combustion engine, the first motor, the second motor, and the multi-axes-type power input output mechanism to ensure efficient output of the power equivalent to the set power demand to the driveshaft. This arrangement desirably enhances the overall energy efficiency of the whole power output apparatus.

In one preferable structure of this embodiment with the control module, the power output apparatus further includes an accumulator unit that transmits electric power to and from the first motor and the second motor. The control module changes over a working control mode among a first control mode, a second control mode, a third control mode, and a fourth control mode to output the power equivalent to the set power demand to the driveshaft. The first control mode makes control to ensure output of the power equivalent to the set power demand to the driveshaft without using the power of the first internal combustion engine but with using the power of the second internal combustion engine. The second control mode makes control to ensure output of the power equivalent to the set power demand to the driveshaft without using the power of the second internal combustion engine but with using the power of the first internal combustion engine. The third control mode makes control to ensure output of the power equivalent to the set power demand to the driveshaft with using the powers of both the first internal combustion engine and the second internal combustion engine. The fourth control mode makes control to ensure output of the power equivalent to the set power demand to the driveshaft without using neither of the powers of the first internal combustion engine and the second internal combustion engine. The power output apparatus of this arrangement ensures output of the power equivalent to the power demand to the drive shaft with adequate selection of the control mode among the first control mode, the second control mode, the third control mode, and the fourth control mode. In the power output apparatus of this structure, the control module may stop operation of the internal combustion engine, which is not used for the power output, in the first control mode or in the second control mode. In the power output apparatus of this structure, the control module may select one of the first control mode, the second control mode, the third control mode, and the fourth control mode based on the set power demand and makes control to ensure output of the power equivalent to the set power demand to the driveshaft. The adequate control based on the power demand is thus executed to ensure output of the required power to the driveshaft.

In another preferable embodiment of the power output apparatus of the invention, the multi-axes-type power input output mechanism includes a first planetary gear unit having three rotational elements and a second planetary gear unit having three rotational elements, where any two rotational elements of the three rotational elements in the second planetary gear unit are respectively connected with any two rotational elements of the three rotational elements in the first planetary gear unit. The four axes of the multi-axes-type power input output mechanism include one axis connected to a remaining rotational element of the three rotational elements of the second planetary gear unit, which is not connected with any of the three rotational elements of the first planetary gear unit, and three axes connected to the three rotational elements of the first planetary gear unit. The multi-axes-type power input output mechanism is readily constructed by combination of two planetary gear units.

The present invention is also directed to a motor vehicle that is equipped with a power output apparatus, which outputs power to a driveshaft and has anyone of the structures described above, and has an axle connected to the driveshaft. The power output apparatus basically includes: a first internal combustion engine; a second internal combustion engine; a first motor; a second motor; and a multi-axes-type power input output mechanism that has multiple axes including four axes, that is, a first axis linked to an output shaft of the first internal combustion engine, a second axis linked to an output shaft of the second internal combustion engine, a third axis linked to a rotating shaft of the first motor, and a fourth axis linked to a rotating shaft of the second motor, where one of the four axes is connected to the driveshaft, rotations of two of the four axes depend upon rotation speeds of remaining two axes of the four axes, and at least part of powers of the first internal combustion engine, the second internal combustion engine, the first motor, and the second motor are output to the driveshaft with balance of powers input to and output from the multiple axes.

The motor vehicle of the invention is equipped with the power output apparatus having any of the above applications or structures, and accordingly has the similar effects and functions to those of the power output apparatus of the invention described above. Appropriate operation controls of the first internal combustion engine, the second internal combustion engine, the first motor, and the second motor desirably enhance the overall energy efficiency of the whole motor vehicle. The motor vehicle of the invention has the high degree of freedom in operations of the first internal combustion engine and the second internal combustion engine.

BRIEF DESCRIPTION OF THE DRAWINGS

FIG. 12 shows possible connection structures of two engines and two motors with four axes, except the connection design of the first embodiment;

FIG. 20 shows possible connection structures of two engines and two motors with four axes, except the connection design of the second embodiment.

BEST MODES OF CARRYING OUT THE INVENTION

Several modes of carrying out the invention are described below as preferred embodiments.

A. First Embodiment

Figure 1:
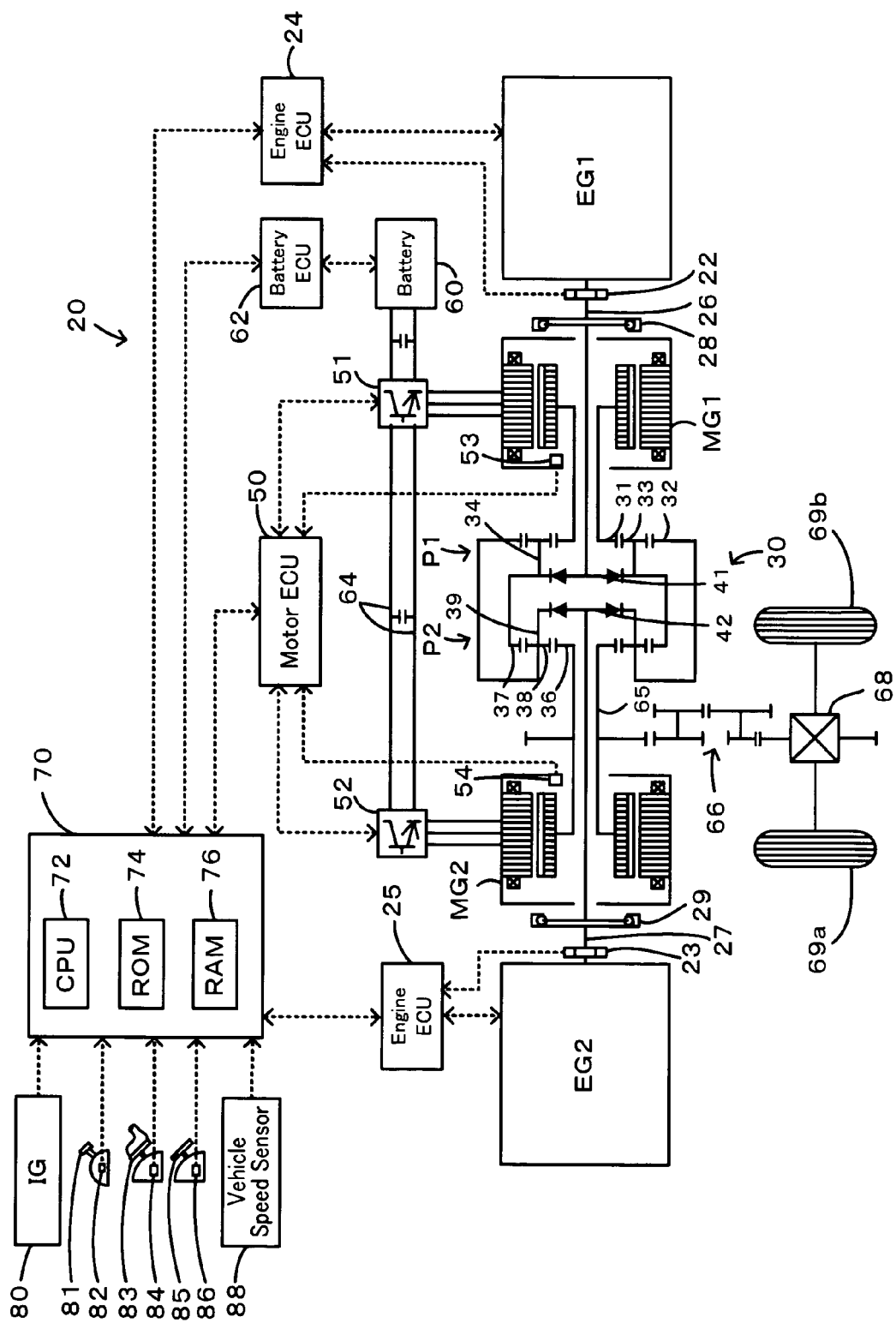
FIG. 1 schematically illustrates the configuration of a hybrid vehicle 20 equipped with a power output apparatus in a first embodiment of the invention.

FIG. 1 schematically illustrates the configuration of a hybrid vehicle 20 equipped with a power output apparatus in a first embodiment of the invention. As illustrated, the hybrid vehicle 20 of the first embodiment includes two engines EG1 and EG2, a four axes-type power distribution integration mechanism 30 that is connected to crankshafts 26 and 27 of the engines EG1 and EG2 via dampers 28 and 29 and is also connected to drive wheels 69a and 69b via a differential gear 68 and a gear mechanism 66, a motor MG1 that is linked with the power distribution integration mechanism 30 and has power generation capability, a motor MG2 that is also linked with the power distribution integration mechanism 30 and has power generation capability, and a hybrid electronic control unit 70 that controls the operations of the whole power output apparatus. The engines EG1 and EG2 are both internal combustion engines that consume a hydrocarbon fuel, such as gasoline or light oil, to output power and are respectively under operation control of engine electronic control units (hereafter referred to as engine ECUs) 24 and 25. The engine ECUs 24 and 25 perform fuel injection control, ignition control, and intake air flow regulation of the respective engines EG1 and EG2. The engine ECUs 24 and 25 receive diverse signals required for the operation control of the engines EG1 and EG2, for example, signals representing rotational positions of the crankshafts 26 and 27 of the engines EG1 and EG2 from crank position sensors 22 and 23. The engine ECUs 24 and 25 establish communication with the hybrid electronic control unit 70 to drive and control the engines EG1 and EG2 in response to control signals received from the hybrid electronic control unit 70 and to output data regarding the operating conditions of the engines EG1 and EG2 to the hybrid electronic control unit 70 according to the requirements.

The power distribution integration mechanism 30 includes two single pinion planetary gears P1 and P2 and two one-way clutches 41 and 42. A sun gear 31, a ring gear 32, and a carrier 34 linked with a pinion gear 33 of the first planetary gear P1 are respectively connected to a rotating shaft of the motor MG1, to the crankshaft 27 of the engine EG2 via the one-way clutch 42, and to the crankshaft 26 of the engine EG1 via the one-way clutch 41. A sun gear 36, a ring gear 37, and a carrier 39 linked with a pinion gear 38 of the second planetary gear P2 are respectively connected to a rotating shaft of the motor MG2, to the carrier 34 of the first planetary gear P1, and to the ring gear 32 of the first planetary gear P1. A driveshaft 65 connecting with the sun gear 36 of the second planetary gear P2 is linked to the drive wheels 69a and 69b via the gear mechanism 66 and the differential gear 68. When rotation speeds Ne1 and Ne2 of the engines EG1 and EG2 respectively increase to or above rotation speeds of the carrier 34 (the ring gear 37) and the ring gear 32 (the carrier 39), the one-way clutches 41 and 42 engage with each other to be integrated and to transmit the output powers of the engines EG1 and EG2 to the carrier 34 and the ring gear 32. When the rotation speeds Ne1 and Ne2 of the engines EG1 and EG2 are respectively lower than the rotation speeds of the carrier 34 and the ring gear 32, on the other hand, the one-way clutches 41 and 42 run idle to disconnect the engines EG1 and EG2 from the carrier 34 and the ring gear 32.

Both the motors MG1 and MG2 are known synchronous motor generators that are driven as a generator and as a motor. The motors MG1 and MG2 transmit electric power to and from a battery 60 via inverters 51 and 52. Power lines 64 that connect the inverters 51 and 52 with the battery 60 are constructed as a positive electrode bus line and a negative electrode bus line shared by the inverters 51 and 52. This arrangement enables the electric power generated by one of the motors MG1 and MG2 to be consumed by the other motor. The battery 60 is charged with a surplus of the electric power generated by the motor MG1 or MG2 and is discharged to supplement an insufficiency of the electric power. When the power balance is attained between the motors MG1 and MG2, the battery 60 is neither charged nor discharged. Operations of both the motors MG1 and MG2 are controlled by a motor electronic control unit (hereafter referred to as motor ECU) 50. The motor ECU 50 receives diverse signals required for controlling the operations of the motors MG1 and MG2, for example, signals from rotational position detection sensors 53 and 54 that detect the rotational positions of rotors in the motors MG1 and MG2 and phase currents applied to the motors MG1 and MG2 and measured by current sensors (not shown). The motor ECU 50 outputs switching control signals to the inverters 51 and 52. The motor ECU 50 communicates with the hybrid electronic control unit 70 to control operations of the motors MG1 and MG2 in response to control signals transmitted from the hybrid electronic control unit 70 while outputting data relating to the operating conditions of the motors MG1 and MG2 to the hybrid electronic control unit 70 according to the requirements.

The battery 60 is under control and management of a battery electronic control unit (hereafter referred to as battery ECU) 62. The battery ECU 62 inputs signals required for management and control of the battery 60, for example, an inter-terminal voltage from a voltage sensor (not shown) located between terminals of the battery 60, a charge-discharge current from a current sensor (not shown) located in the power line 64 connecting with an output terminal of the battery 60, and a battery temperature from a temperature sensor (not shown) attached to the battery 60. The battery ECU 62 outputs data regarding the conditions of the battery 60 to the hybrid electronic control unit 70 by communication according to the requirements. For management and control of the battery 60, the battery ECU 62 computes a remaining charge level or current state of charge (SOC) of the battery 60 from an integration of the charge-discharge current measured by the current sensor (not shown). The battery ECU 62 also sets input and output limits Win and Wout of the battery 60, based on the computed state of charge SOC and the measured battery temperature of the battery 60.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port: an ignition signal from an ignition switch 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 88. The hybrid electronic control unit 70 communicates with the engine ECUs 24 and 25, the motor ECU 50, and the battery ECU 62 via the communication port to transmit diverse control signals and data to and from the engine ECUs 24 and 25, the motor ECU 50, and the battery ECU 62, as mentioned previously.

The hybrid vehicle 20 of the first embodiment having the above construction sets a drive torque demand Td* to be output to the driveshaft 65, based on the given vehicle speed V and the given accelerator opening Acc, which is equivalent to the driver's depression amount of the accelerator pedal 83, and drives and controls the engines EG1 and EG2 and the motors MG1 and MG2 to ensure output of a power demand equivalent to the preset drive torque demand Td* to the driveshaft 65. There are several drive control modes of the engines EG1 and EG2 and the motors MG1 and MG2. In a torque conversion drive mode, the engines EG1 and EG2 are driven and controlled such that the output power of either or both of the engines EG1 and EG2 satisfies a required level of power equivalent to the power demand. The motors MG1 and MG2 are driven and controlled to enable all the output power of the engines EG1 and EG2 to be subjected to torque conversion by means of the power distribution integration mechanism 30 and the motors MG1 and MG2 and to be output to the driveshaft 65. In a charge-discharge drive mode, the engines EG1 and EG2 are driven and controlled such that the output power of either or both of the engines EG1 and EG2 satisfies a required level of power equivalent to the sum of the power demand and electric power used to charge the battery 60 or discharged from the battery 60. The motors MG1 and MG2 are driven and controlled to enable all or part of the output power of the engines EG1 and EG2, which is equivalent to the power demand with charge or discharge of the battery 60, to be subjected to torque conversion by means of the power distribution integration mechanism 30 and the motors MG1 and MG2 and to be output to the driveshaft 65. In a motor drive mode, the motors MG1 and MG2 are driven and controlled to ensure output of a required level of power equivalent to the power demand to the driveshaft 65, while both the engines EG1 and EG2 stop their operations. The control in the torque conversion drive mode is substantially similar to the control in the charge-discharge drive mode without charge or discharge of the battery 60.

Figure 2:
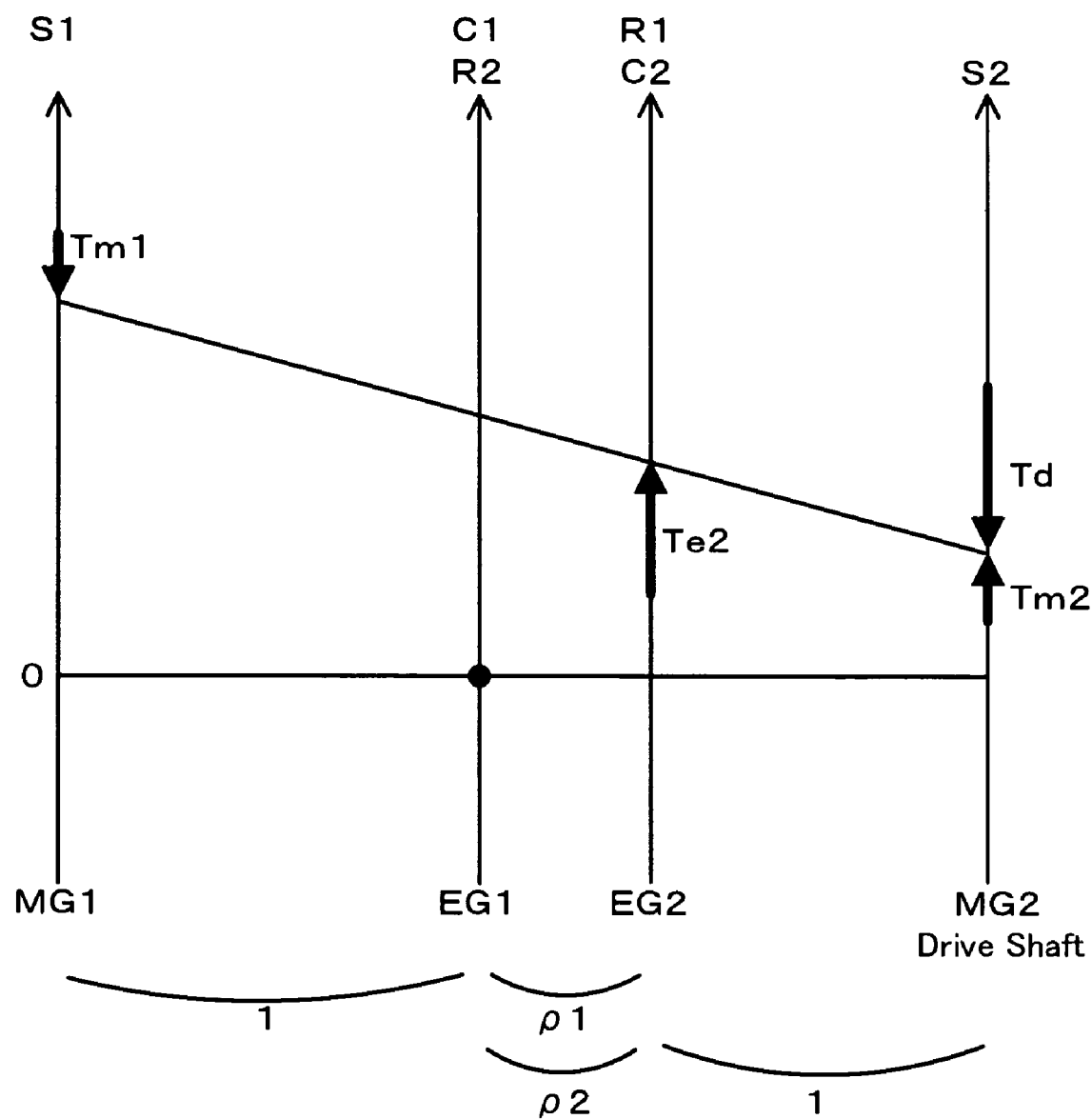
FIG. 2 is an alignment chart showing torque-rotation speed dynamics of respective rotation elements included in a power distribution integration mechanism 30 in a first drive pattern.

The torque conversion drive mode and the charge-discharge drive mode have several different drive patterns to output the powers from the engine EG1 and EG2. In a first drive pattern, while the engine EG1 stops its operation, the engine EG2 is driven to output the power that is subjected to torque conversion by means of the motors MG1 and MG2 and is transmitted to the driveshaft 65. In a second drive pattern, while the engine EG2 stops its operation, the engine EG1 is driven to output the power that is subjected to torque conversion by means of the motors MG1 and MG2 and is transmitted to the driveshaft 65. In a third drive pattern, both the engines EG1 and EG2 are driven to output the power that is subjected to torque conversion by means of the motors MG1 and MG2 and is transmitted to the driveshaft 65. The first drive pattern is described with reference to the alignment chart of FIG. 2. The connection of the first planetary gear P1 with the second planetary gear P2 as described above attains the functions of a four element-type power distribution integration mechanism having four axes as its rotational elements: that is, the sun gear 31 of the first planetary gear P1 (hereafter referred to as S1 axis), the carrier 34 of the first planetary gear P1 and the ring gear 37 of the second planetary gear P2 (hereafter referred to as C1-R2 axis), the ring gear 32 of the first planetary gear P1 and the carrier 39 of the second planetary gear P2 (hereafter referred to as R1-C2 axis), and the sun gear 36 of the second planetary gear P2 (hereafter referred to as S2 axis). In the four element-type power distribution integration mechanism, determination of the rotation speeds of any two axes among the four axes automatically determines the rotation speeds of the residual two axes. The power input to or output from any one axis among the four axes depends upon the powers input to and output from the residual three axes. The S1 axis on the left end represents the rotation speed of the sun gear 31 of the first planetary gear P1 that is equivalent to the rotation speed Nm1 of the motor MG1. The C1-R2 axis represents both the rotation speed of the carrier 34 of the first planetary gear P1 and the rotation speed of the ring gear 37 of the second planetary gear P2. The R1-C2 axis represents both the rotation speed of the ring gear 32 of the first planetary gear P1, which is equivalent to the rotation speed Ne2 of the engine EG2, and the rotation speed of the carrier 39 of the second planetary gear P2. The S2 axis on the right end represents the rotation speed of the sun gear 36 of the second planetary gear P2 that is equivalent to the rotation speed Nd of the driveshaft 65 and the rotation speed of the motor MG2. In this alignment chart, $\rho 1$ denotes a gear ratio of the first planetary gear P1 (=number of teeth on sun gear 31/number of teeth on ring gear 32), and $\rho 2$ denotes a gear ratio of the second planetary gear P2 (=number of teeth on sun gear 36/number of teeth on ring gear 37). In the first drive pattern, the engine EG1 stops its operation. Since the engine EG1 is connected to the carrier 34 via the one-way clutch 41, the four element-type power distribution integration mechanism works with the engine EG1 kept at a stop as shown in the alignment chart of FIG. 2. In this state, the powers are input to and output from three axes among the four axes, and the output power of the engine EG2 goes through torque conversion by means of the motors MG1 and MG2 and is transmitted to the driveshaft 65.

Figure 3:
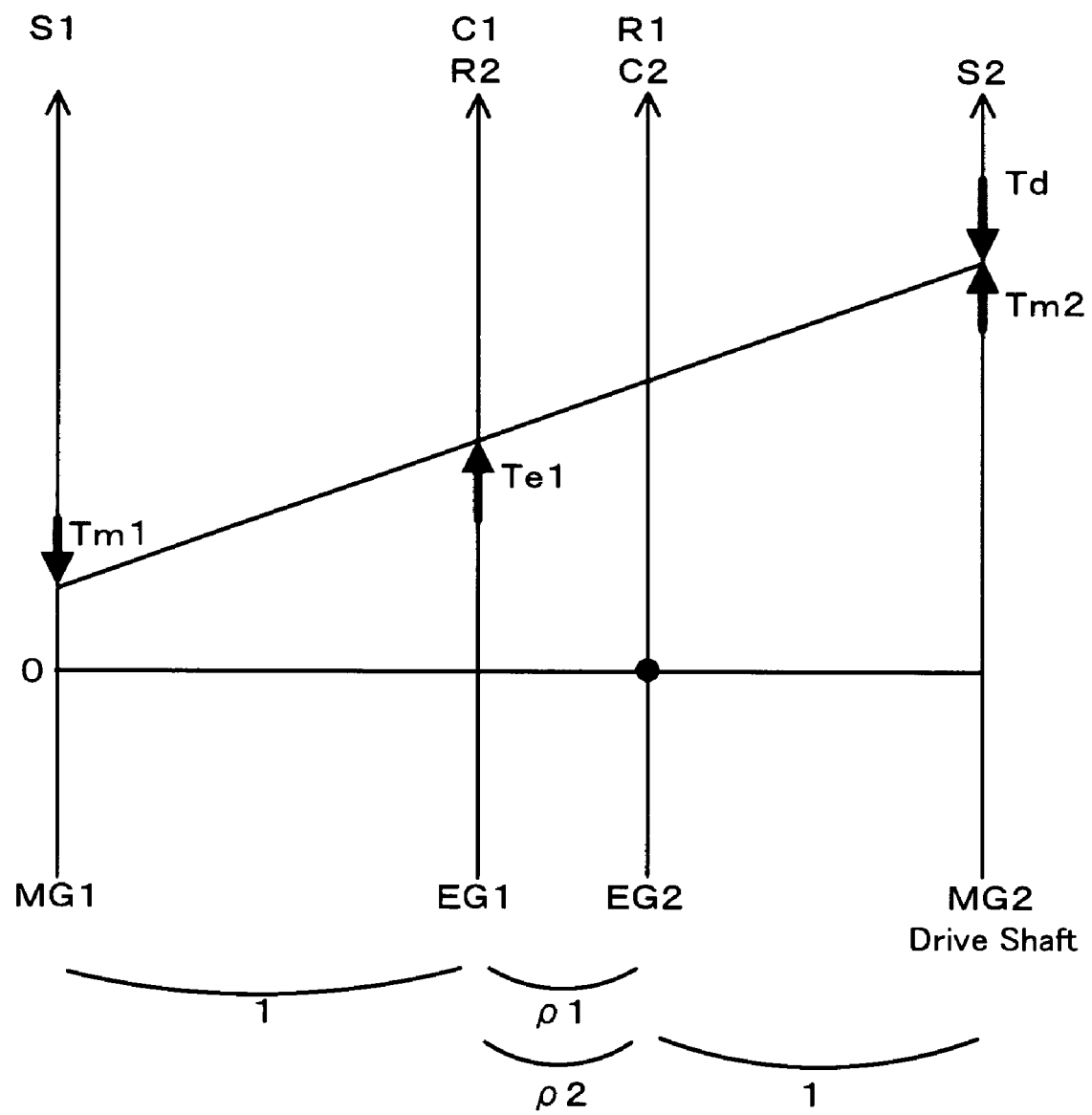
FIG. 3 is an alignment chart showing torque-rotation speed dynamics of the respective rotation elements included in the power distribution integration mechanism 30 in a second drive pattern.
Figure 4:
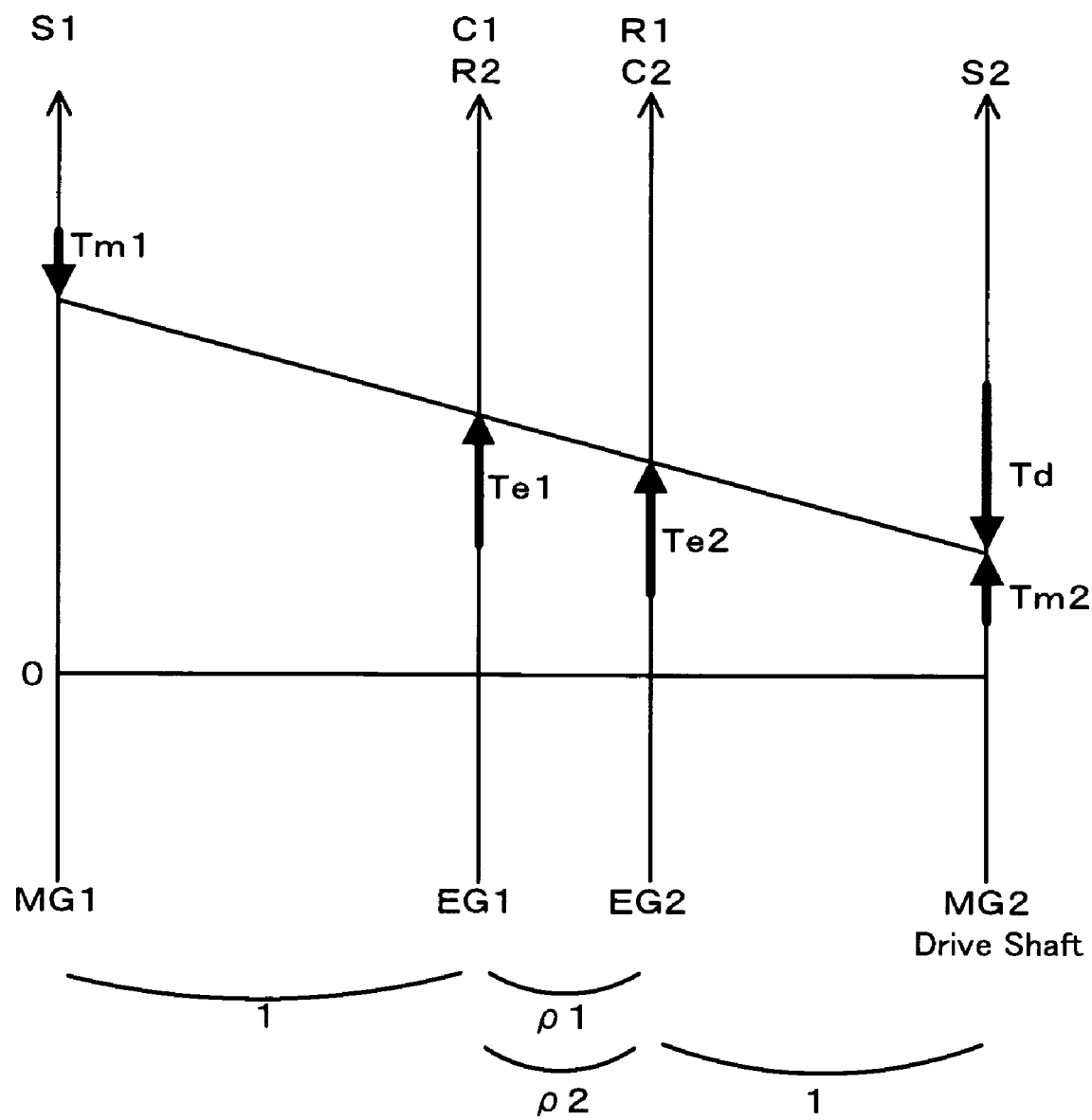
FIG. 4 is an alignment chart showing torque-rotation speed dynamics of the respective rotation elements included in the power distribution integration mechanism 30 in a third drive pattern.
Figure 5:
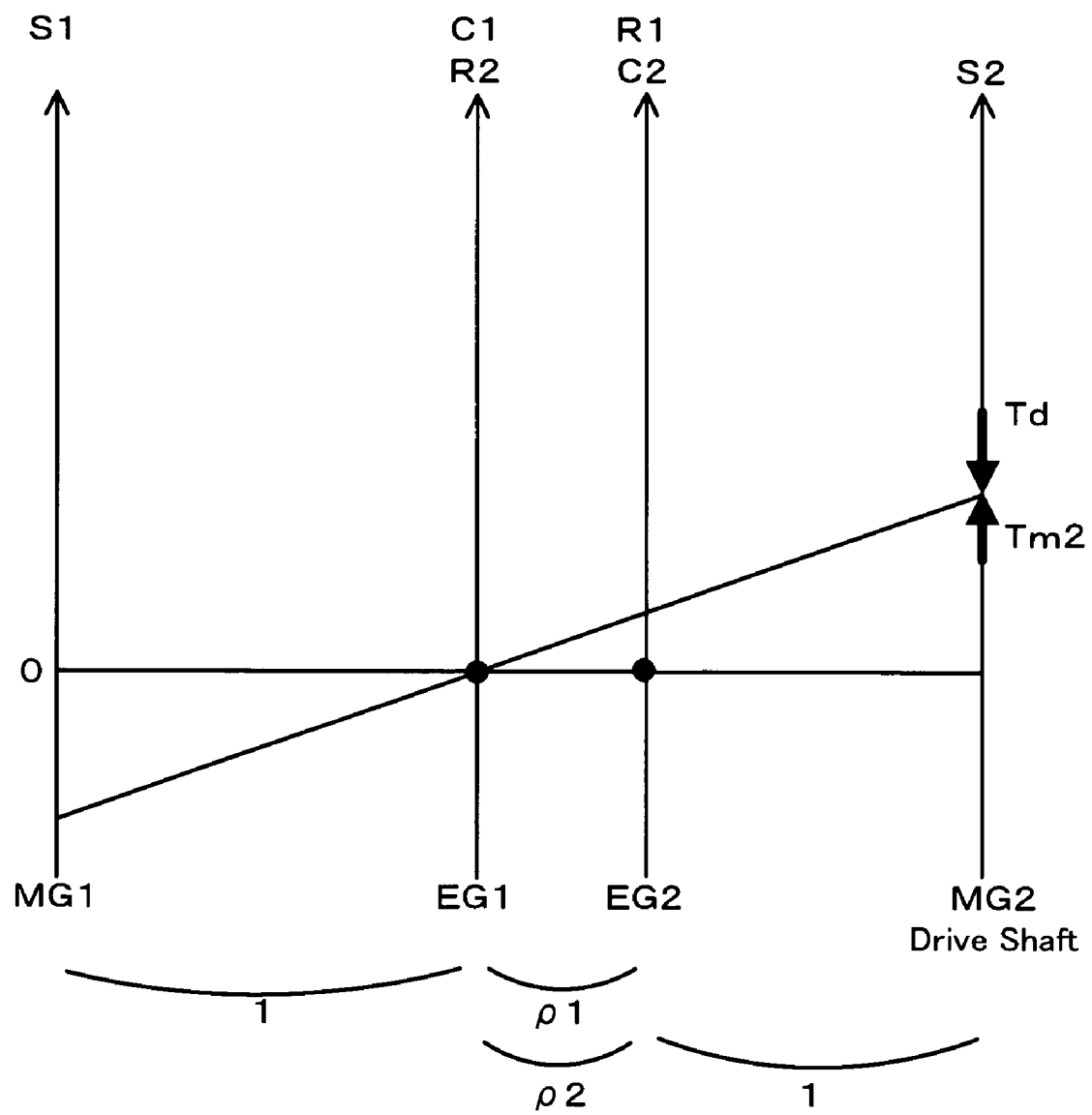
FIG. 5 is an alignment chart showing torque-rotation speed dynamics of the respective rotation elements included in the power distribution integration mechanism 30 in a motor drive mode.

The second drive pattern is shown in the alignment chart of FIG. 3. In the second drive pattern, the engine EG2 stops its operation. Since the engine EG2 is connected to the ring gear 32 via the one-way clutch 42, the four element-type power distribution integration mechanism works with the engine EG2 kept at a stop as shown in the alignment chart of FIG. 3. In this state, the output power of the engine EG1 goes through torque conversion by means of the motors MG1 and MG2 and is output to the driveshaft 65. The third drive pattern is shown in the alignment chart of FIG. 4. In the third drive pattern, the output power of the engines EG1 and EG2 goes through torque conversion by means of the motors MG1 and MG2 and is output to the driveshaft 65. In the motor drive mode, both the engines EG1 and EG2 stop their operations as shown in the alignment chart of FIG. 5. The rotation speed of the carrier 34 of the first planetary gear P1 connected to the engine EG1 via the one-way clutch 41 is accordingly equal to 0, and the motor MG2 outputs torque to the driveshaft 65.

Figure 6:
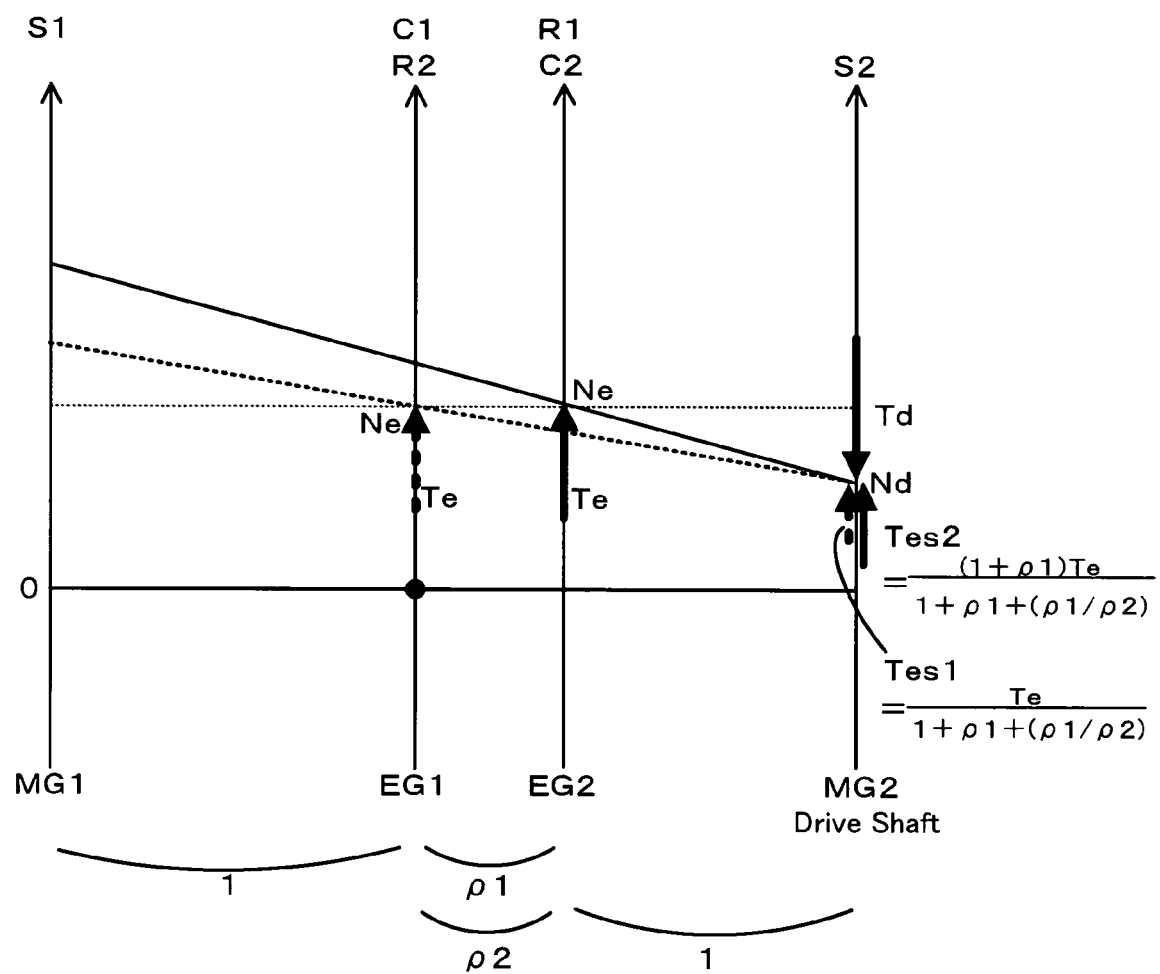
FIG. 6 is an alignment chart showing comparison between the first drive pattern and the second drive pattern in a standard operation state.

The respective drive patterns have different characteristics as described below. The description regards the comparison between the first drive pattern and the second drive pattern. FIG. 6 is an alignment chart showing comparison between the first drive pattern and the second drive pattern on the assumption of the operations of the engines EG1 and EG2 at an identical drive point. Either of the engines EG1 and EG2 is driven at an efficient drive point (defined by a rotation speed Ne and a torque Te) to ensure output of all the power demand required for the driveshaft 65 (expressed as rotation speed Nd×torque Td). In the alignment chart of FIG. 6, the solid line shows the first drive pattern in which the engine EG2 is driven at this efficient drive point, and the broken line shows the second drive pattern in which the engine EG1 is driven at this efficient drive point. Respective parts of the output powers of the engine EG1 and the engine EG2 are directly transmitted to the driveshaft 65 according to distribution rates, which depend upon the gear ratios $\rho 1$ and $\rho 2$. Direct transmission torques Tes1 and Tes2, which are directly output from the engines EG1 and EG2 to the driveshaft 65, are computed by Equations (1) and (2) given below:

$$Tes1 = 1/(1+\rho1+(\rho1/\rho2)) \, Te \quad (1)$$

$$Tes2 = (1+\rho1)/(1+\rho1+(\rho1/\rho2)) Te \quad (2)$$

As clearly understood from the comparison between Equations (1) and (2), the direct transmission torque Tes2 under the operation of the engine EG2 is explicitly greater than the direct transmission torque Tes1 under the operation of the engine EG1. It is here assumed that all the output power of the engine EG1 or EG2 goes through torque conversion and is output to the driveshaft 65 without charge or discharge of the battery 60. In this state, the motor MG2 outputs a differential torque between the torque demand Td and the direct transmission torque Tes1 or Tes2 of the engine EG1 or EG2. The torque output of the motor MG2 is accompanied with electric power conversion, where the motor MG1 generates electric power from part of the output power of the engine EG1 or EG2 and the motor MG2 is driven with the generated electric power. The efficiency of torque output with electric power conversion is naturally lower than the efficiency of torque output without electric power generation. The greater direct transmission torques from the engines EG1 and EG2 to the driveshaft 65 result in the higher overall energy efficiency. The energy efficiency in the first drive pattern is thus higher than the energy efficiency in the second drive pattern.

Figure 7:
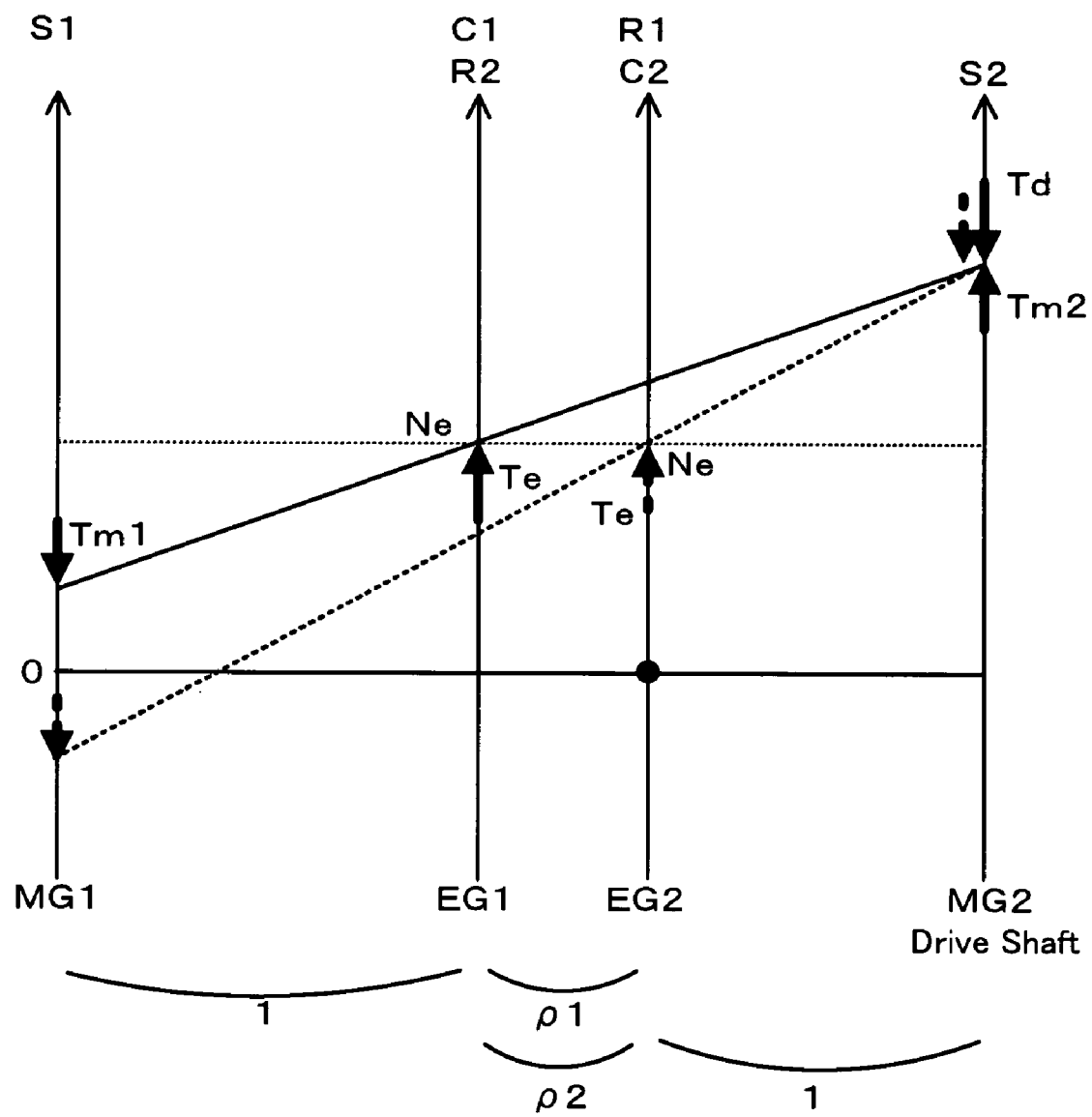
FIG. 7 is an alignment chart showing comparison between the first drive pattern and the second drive pattern in a state of application of a low-torque power to a driveshaft 65 driven at a high rotation speed.

In a high-speed cruise drive of the hybrid vehicle 20 with a relatively small power demand (Nd×Td), the rotation speed Nd of the driveshaft 65 is relatively high and the rotation speed Ne of the engine EG1 or EG2 is relatively low. FIG. 7 is an alignment chart showing comparison between the first drive pattern and the second drive pattern on the assumption of the operations of the engine EG1 and EG2 at an identical drive point during this high-speed cruise drive. In the alignment chart of FIG. 7, the solid line shows the second drive pattern in which the engine EG1 is driven at the drive point defined by the rotation speed Ne and the torque Te, and the broken line shows the first drive pattern in which the engine EG2 is driven at this drive point. During the operations of the engines EG1 and EG2 at this drive point, the motor MG1 may have a negative rotation speed Nm1 as shown by the alignment chart in the first drive pattern. In this state, the motor MG1 is under power control to output a torque in an identical direction with the rotating direction as a reaction force against the output power of the engine EG2. According to the energy balance, the motor MG2 in this state is under regenerative control to supply the electric power consumed by the motor MG1. The motor MG2 generates electric power to satisfy part of the power to be output to the driveshaft 65. The generated electric power is supplied to the motor MG1 and is output in the form of mechanical power to the power distribution integration mechanism 30 located upstream of the driveshaft 65. This causes a power cycle of mechanical power—electric power—mechanical power. The power generation efficiency and the motor efficiency affect an identical part of the energy and thus lower the overall energy efficiency of this power cycle. In the standard operation state, the energy efficiency in the first drive pattern is higher than the energy efficiency in the second drive pattern as mentioned previously. In the presence of this power cycle, however, the energy efficiency in the first drive pattern may not be higher than the energy efficiency in the second drive pattern. Namely the second drive pattern without the power cycle may have the higher overall energy efficiency than the first drive pattern with a certain degree of the power cycle. Under some combination of the vehicle speed and the power demand, the power cycle may occur in both of the first drive pattern and the second drive pattern. The overall energy efficiency in this case depends upon the efficiencies of the engines EG1 and EG2 and the efficiencies of the motors MG1 and MG2 in the presence of the power cycle. The second drive pattern with the higher rotation speed Nm1 of the motor MG1 is generally expected to have the smaller degree of the power cycle and the higher energy efficiency. From the viewpoint of the energy efficiency, a preferable procedure changes over the drive pattern from the first drive pattern to the second drive pattern in a transient state between the state with the power cycle only in the first drive pattern and the state with the power cycle in both of the first drive pattern and the second drive pattern. The energy efficiency does not immediately decrease by the occurrence of the power cycle. The changeover point from the first drive pattern to the second drive pattern is set by taking into account the efficiencies of the engines EG1 and EG2 and the efficiencies of the motors MG1 and MG2. The direction of the torque of the motor MG2 is reversed in response to a decrease in rotation speed Nm1 of the motor MG1 to a negative value. A further decrease in rotation speed Nm1 of the motor MG1 causes a changeover of the drive pattern from the first drive pattern to the second drive pattern and reverses the direction of the torque of the motor MG2 again. In order to control such frequent reversal of the direction of the torque of the motor MG2, one applicable technique changes over the drive pattern from the first drive pattern to the second drive pattern when the rotation speed Nm1 of the motor MG1 reaches '0'. Another applicable technique changes over the drive pattern from the first drive pattern to the second drive pattern based on the vehicle speed V and the torque demand Td required for the driveshaft 65, irrespective of the rotation speed Nm1 of the motor MG1. For example, in response to a requirement of a relatively low torque in the relatively high-speed cruise drive, there is a possibility that the rotation speed Nm1 of the motor MG1 decreases to a negative value. The drive pattern is thus changed over from the first drive pattern to the second drive pattern. In response to a relatively high torque demand Td required for the driveshaft 65, the third drive pattern is selected to operate both the engines EG1 and EG2.

Figure 8:
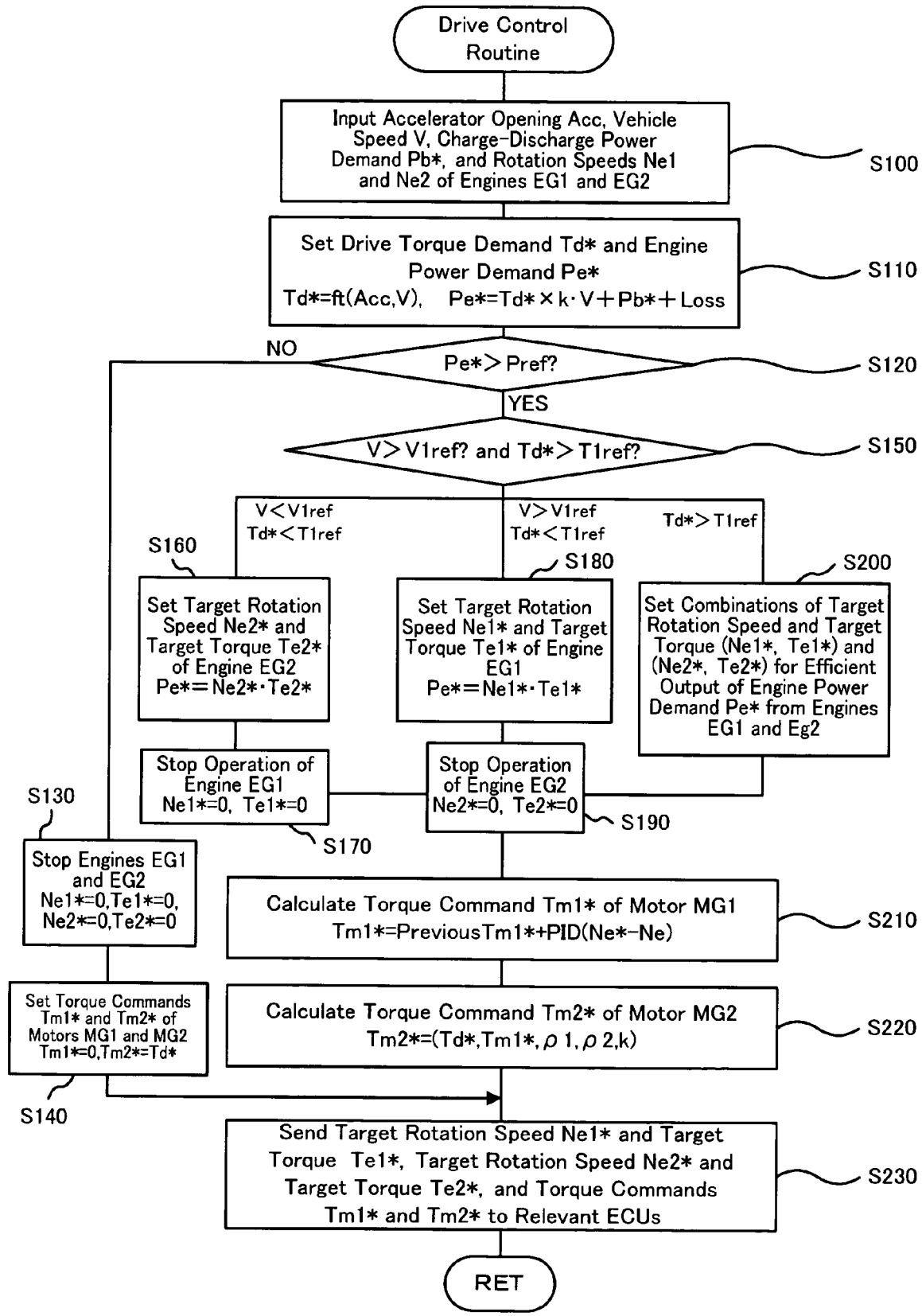
FIG. 8 is a flowchart showing a drive control routine executed by a hybrid electronic control unit 70 in the first embodiment.

The description regards the operations of the hybrid vehicle 20 of the first embodiment having the configuration discussed above. FIG. 8 is a flowchart showing a drive control routine executed by the hybrid electronic control unit 70. This drive control routine is repeatedly executed at preset time intervals (for example, at every 8 msec).

In the drive control routine, the CPU 72 of the hybrid electronic control unit 70 first inputs various data required for control, that is, the accelerator opening Acc from the accelerator pedal position sensor 84, the vehicle speed V from the vehicle speed sensor 88, rotation speeds Ne1 and Ne2 of the engines EG1 and EG2, and a charge-discharge power demand Pb* to be charged into the battery 60 or to be discharged from the battery 60 (step S100). The rotation speeds Ne1 and Ne2 of the engines EG1 and EG2 are computed from the rotational positions of the crankshafts 26 and 27 of the engines EG1 and EG2 detected by the crank position detection sensors 22 and 23 and are received from the engine ECUs 24 and 25 by communication. The charge-discharge power demand Pb* of the battery 60 is set based on the state of charge SOC of the battery 60 and is received from the battery ECU 62 by communication.

Figure 9:
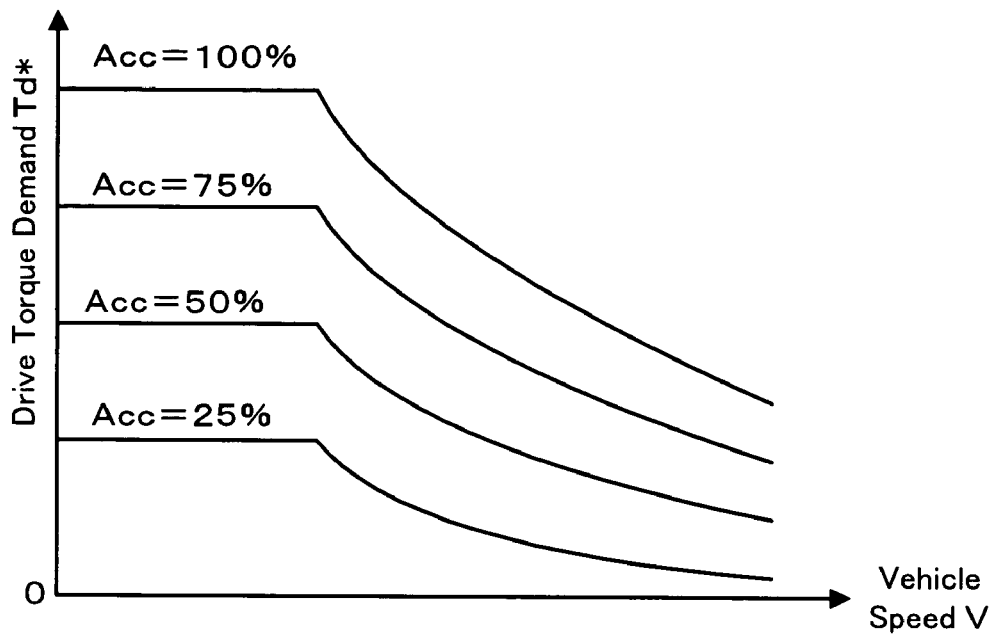
FIG. 9 shows one example of a drive torque demand setting map.

After the data input, the CPU 72 sets a drive torque demand Td* to be output to the driveshaft 65 as a torque required for the hybrid vehicle 20 and an engine power demand Pe* to be output from the engines EG1 and EG2, based on the input accelerator opening Acc and the input vehicle speed V (step S110). A concrete procedure of setting the drive torque demand Td* in this embodiment stores in advance variations in drive torque demand Td* against the accelerator opening Acc and the vehicle speed V as a torque demand setting map in the ROM 74 and reads the drive torque demand Td* corresponding to the given accelerator opening Acc and the given vehicle speed V from the map. One example of the torque demand setting map is shown in FIG. 9. The engine power demand Pe* is calculated as the sum of the product of the drive torque demand Td* and a rotation speed Nd of the driveshaft 65, the charge-discharge power demand Pb* of the battery 60, and a potential loss. The rotation speed Nd of the driveshaft 65 is obtained by multiplying the vehicle speed V by a conversion factor k.

The engine power demand Pe* is compared with a preset reference value Pref (step S120). The reference value Pref is a threshold value for selection of the motor drive mode accompanied with stop of the operations of both the engines EG1 and EG2. When the engine power demand Pe* is less than the preset reference value Pref, target rotation speeds Ne1* and Ne2* and target torques Te1* and Te2* of the engines EG1 and EG2 are all set equal to 0 to stop the operations of the engine EG1 and EG2 (step S130). A torque command Tm1* of the motor MG1 and a torque command Tm2* of the motor MG2 are respectively set equal to 0 and to the drive torque demand Td* (step S140). The drive control routine is terminated after sending the target rotation speeds Ne1* and Ne2* and the target torques Te1* and Te2* of the engines EG1 and EG2 to the engine ECUs 24 and 25 and sending the torque commands Tm1* and Tm2* of the motors MG1 and MG2 to the motor ECU 50 (step S230). The engine ECUs 24 and 25 respectively receive the target rotation speed Ne1* and the target torque Te1* and the target rotation speed Ne2* and the target torque Te2* and stop fuel injection control and ignition control to attain drive points of the engines EG1 and EG2 defined by the target rotation speed Ne1* and the target torque Te1* and by the target rotation speed Ne2* and the target torque Te2* and thereby stop the engines EG1 and EG2. In the operation state of the engines EG1 and EG2, the engine ECUs 24 and 25 stop the fuel injection control and ignition control to stop the operations of the engines EG1 and EG2. In the stop state of the engines EG1 and EG2, on the other hand, the engine ECUs 24 and 25 keep the engines EG1 and EG2 at stop. The motor ECU 50 receives the torque commands Tm1* and Tm2* and performs switching control of switching elements included in the inverters 51 and 52 to drive the motor MG1 with the torque command Tm1* and to drive the motor MG2 with the torque command Tm2*.

Figure 10:
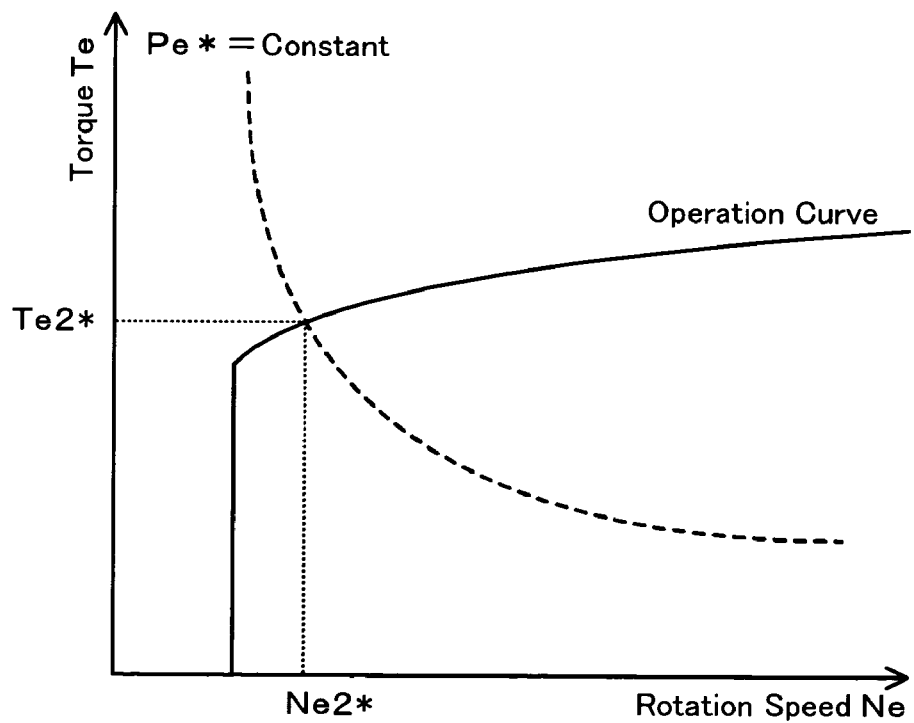
FIG. 10 shows an efficient operation curve of an engine EG2 to set a target rotation speed Ne2* and a target torque Te2* of the engine EG2.
Figure 11:
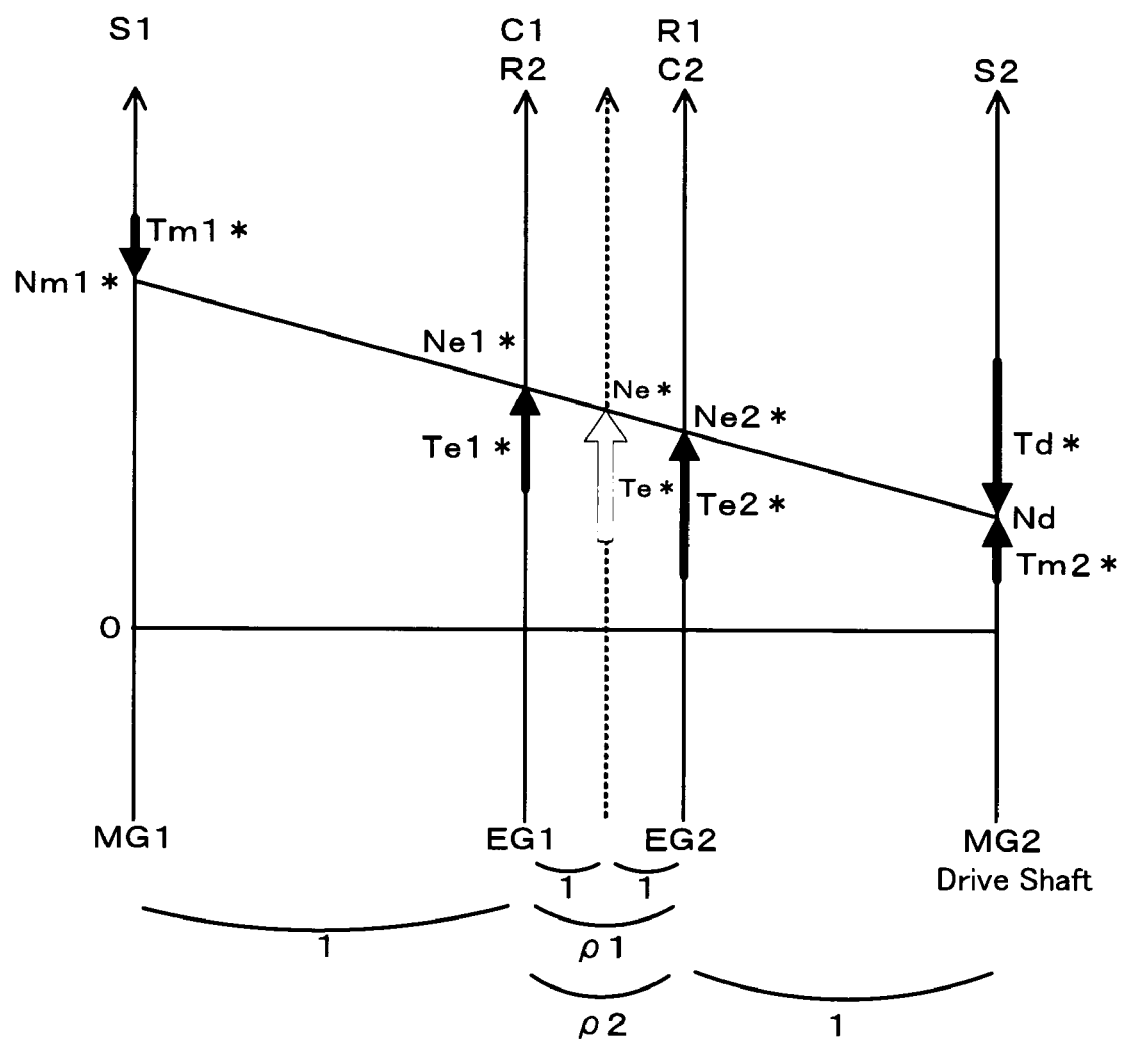
FIG. 11 shows a process of setting target rotation speeds Ne1* and Ne2* and target torques Te1* and Te2* of engines EG1 and EG2 in the third drive pattern.

When the engine power demand Pe* is not less than the preset reference value Pref, on the other hand, the CPU 72 sequentially compares the vehicle speed V with a preset reference speed V1ref and the drive torque demand Td* with a preset reference torque T1ref (step S150). The reference speed V1ref and the reference torque T1ref are threshold values used for selection of an adequate drive pattern. The reference speed V1ref is used as a criterion for determining whether the vehicle speed V implies a potential for the occurrence of the power cycle. The reference torque T1ref is used as a criterion for identifying the requirement for output of the power from both of the engines EG1 and EG2. When the vehicle speed V is lower than the preset reference speed V1ref and the drive torque demand Td* is less than the preset reference torque T1ref, that is, in response to a requirement of a relatively low torque in a relatively low-speed drive, the current state is specified as the standard operation state with no potential for the occurrence of the power cycle. In this state, the CPU 72 selects the first drive pattern and sets the target rotation speed Ne2* and the target torque Te2* of the engine EG2 according to an efficient operation curve for efficient operation of the engine EG2 and a curve of constant engine power demand Pe* (step S160). The CPU 72 then sets 0 to both the target rotation speed Ne1* and the target torque Te1* of the engine EG1 in order to stop the operation of the engine EG1 (step S170). FIG. 10 shows an efficient operation curve of the engine EG2 to set the target rotation speed Ne2* and the target torque Te2* of the engine EG2. As clearly shown in FIG. 10, the target rotation speed Ne2* and the target torque Te2* are given as an intersection of the efficient operation curve of the engine EG2 and a curve of constant engine power demand Pe* (=Ne2*×Te2*). When the vehicle speed V is not lower than the preset reference speed V1rf and the drive torque demand Td* is less than the preset reference torque T1ref, that is, in response to a requirement of a relatively low torque in a relatively high-speed drive, the current state is specified to have a high potential for the occurrence of the power cycle. In this state, the CPU 72 selects the second drive pattern and sets the target rotation speed Ne1* and the target torque Te1* of the engine EG1 in the same manner as the setting of the target rotation speed Ne2* and the target torque Te2* of the engine EG2 in the first drive pattern (step S180) and sets 0 to both the target rotation speed Ne2* and the target torque Te2* of the engine EG2 in order to stop the operation of the engine EG2 (step S190). When the drive torque demand Td* is not less than the preset reference torque T1ref, that is, in response to a requirement of a relatively high torque, the current state is specified to have a requirement for the power output from both the engines EG1 and EG2. In this state, the CPU 72 selects the third drive pattern and sets the target rotation speeds Ne1* and Ne2* and the target torques Te1* and Te2* of the engines EG1 and EG2 according to the engine power demand Pe* (step S200). A concrete procedure described below may be adopted to set the drive points of the engines EG1 and EG2 (defined by the combination of the target rotation speed Ne1* and the target torque Te1* and by the combination of the target rotation speed Ne2* and the target torque Te2*) in the third drive pattern. The procedure first specifies a distribution rate k (=ratio of power demand division Pe1* to be output from the engine EG1 to engine power demand Pe*), and calculates power demand divisions Pe1* and Pe2*, which are to be output respectively from the engines EG1 and EG2, from the specified distribution rate k and the engine power demand Pe*. The procedure subsequently sets an efficient drive point for the efficient operation of either or both of the engines EG1 and EG2 to ensure output of the power demand divisions Pe1* and Pe2* from the engines EG1 and EG2. In this embodiment, the distribution rate k is set equal to 0.5. This sets half the engine power demand Pe*/2 to both the power demand divisions Pe1* and Pe2* of the engines EG1 and EG2. The procedure then assumes a virtual engine at a 1:1 internally dividing point of the engine EG1 (C1-R2 axis) and the engine EG2 (R1-C2 axis) and sets a tentative efficient drive point (defined by an engine rotation speed Ne* and an engine torque Te*) of the virtual engine to output half the engine power demand Pe*/2. The procedure refers to an alignment chart based on the engine rotation speed Ne* and the rotation speed Nd of the driveshaft 65 and sets the drive points of the engines EG1 and EG2 in the third drive pattern. FIG. 11 shows a process of setting the drive points of the engines EG1 and EG2 in this manner. The distribution rate k used in the third drive pattern may be set equal to 0 in the first drive pattern and equal to 1 in the second drive pattern.

After setting the drive points of the engines EG1 and EG2, the torque command Tm1* of the motor MG1 is calculated from the target rotation speed Ne* and the current rotation speed Ne of a working engine according to Equation (3) given below (step S210):

$$Tm1^* = \text{Previous } Tm1^* + k1(Ne^* - Ne) + k2\int(Ne^* - Ne)dt \quad (3)$$

The working engine is the engine EG2 in the first drive pattern, is the engine EG1 in the second drive pattern, and may be either of the engines EG1 and EG2 in the third drive pattern. Equation (3) is a relational expression of feedback control to drive and rotate the driving engine at the target rotation speed Ne*. In Equation (3) given above, 'k1' in the second term and 'k2' in the third term on the right side respectively denote a gain of the proportional and a gain of the integral term.

The torque command Tm2* of the motor MG2 is then calculated from the drive torque demand Td*, the calculated torque command Tm1* of the motor MG1, the gear ratios ρ1 and ρ2, and the distribution rate k according to Equation (4) given below (step S220):

$$Tm2^* = Td^* + f(\rho1, \rho2, k) \times Tm1^* \quad (4)$$

The drive control routine is terminated after sending the target rotation speeds Ne1* and Ne2* and the target torques Te1* and Te2* of the engines EG1 and EG2 to the engine ECUs 24 and 25 and sending the torque commands Tm1* and Tm2* of the motors MG1 and MG2 to the motor ECU 50 (step S230). The engine ECUs 24 and 25 respectively receive the target rotation speed Ne1* and the target torque Te1* and the target rotation speed Ne2* and the target torque Te2* and perform fuel injection control and ignition control of the engines EG1 and EG2 to drive the engines EG1 and EG2 at efficient drive points defined by the target rotation speed Ne1* and the target torque Te1* and by the target rotation speed Ne2* and the target torque Te2*. The motor ECU 50 receives the torque commands Tm1* and Tm2* and performs switching control of the switching elements included in the inverters 51 and 52 as described previously.

As described above, the hybrid vehicle 20 of the first embodiment is under drive control with adequate selection of the drive mode or the drive pattern among the first drive pattern, the second drive pattern, the third drive pattern, and the motor drive mode. In the first drive pattern, while the engine EG1 stops its operation, the engine EG2 is driven to output the power that goes through torque conversion by means of the motors MG1 and MG2 and is output to the driveshaft 65. In the second drive pattern, while the engine EG2 stops its operation, the engine EG1 is driven to output the power that goes through torque conversion by means of the motors MG1 and MG2 and is output to the driveshaft 65. In the third drive pattern, both the engines EG1 and EG2 are driven to output the power that goes through torque conversion by means of the motors MG1 and MG2 and is output to the driveshaft 65. In the motor drive mode, while both the engines EG1 and EG2 stop their operations, the motor MG2 is driven to output the power to the driveshaft 65. The hybrid vehicle 20 of the first embodiment is thus under drive control with selection of the drive pattern (drive mode) to maximize the overall energy efficiency based on the rotation speed Nd and the torque demand Td of the driveshaft 65. This arrangement desirably enhances the degree of freedom in operations of the engines.

The hybrid vehicle 20 of the first embodiment selects the first drive pattern in the standard operation state. In the first drive pattern, while the engine EG1 is at a stop, the power of the engine EG2 driven at the efficient drive point goes through torque conversion by means of the motors MG1 and MG2 and is output to the driveshaft 65. This desirably enhances the overall energy efficiency. The hybrid vehicle 20 of the first embodiment selects the second drive pattern in response to a requirement of a relatively low torque for the driveshaft 65 in a relatively high-speed drive, for example, in a high-speed cruise drive. In the second drive pattern, while the engine EG2 is at a stop, the power of the engine EG1 driven at the efficient drive point goes through torque conversion by means of the motors MG1 and MG2 and is output to the driveshaft 65. This drive control desirably reduces the potential for the occurrence of the power cycle in the second drive pattern, compared with the potential in the first drive pattern and effectively enhances the overall energy efficiency of the whole hybrid vehicle 20. In response to a requirement of a high torque for the driveshaft 65, the hybrid vehicle 20 of the first embodiment selects the third drive pattern. In the third drive pattern, the total power of the engines EG1 and EG2 driven at the efficient drive points goes through torque conversion by means of the motors MG1 and MG2 and is output to the driveshaft 65. This ensures output of a high torque to the driveshaft 65. The hybrid vehicle 20 of the first embodiment selects the motor drive mode when the rotation speed Nd and the torque demand Td of the driveshaft 65 are relatively low and the battery 60 has a sufficient margin in its state of charge SOC. In the motor drive mode, while the engines EG1 and EG2 stop their operations, the hybrid vehicle 20 is driven with the output power of the motor MG2. This arrangement effectively controls the potential noises and vibrations at a start of the hybrid vehicle 20.

In the hybrid vehicle 20 of the first embodiment, the distribution rate k is set equal to 0.5 in the third drive pattern. The distribution rate k is, however, not restricted to 0.5 but may be set equal to any arbitrary value in a value range of greater than 0 and smaller than 1.

In the third drive pattern, the hybrid vehicle 20 of the first embodiment sets the power demand divisions Pe1* and Pe2*, which are to be output respectively from the engines EG1 and EG2, according to the engine power demand P* and the distribution rate k. One possible modification may set a predetermined value α a to a power demand division to be output from one engine and a residual value (Pe*−α) to a power demand division to be output from the other engine. Another possible modification may set a power demand Ne*×Te* for the operation at an efficient drive point (defined by the rotation speed Ne* and the torque Te*) to a power demand division to be output from one engine and set a result of subtraction of the power demand Ne*×Te* from the engine power demand Pe* to a power demand division to be output from the other engine.

In the third drive pattern, the hybrid vehicle 20 of the first embodiment calculates the power demand divisions Pe1* and Pe2* to be output from the engines EG1 and EG2, sets the tentative drive point of the virtual engine, and sets the drive points of the engines EG1 and EG2 based on the tentative drive point. One possible modification may set an efficient drive point of one engine and subsequently set a drive point of the other engine based on the efficient drive point of one engine. For example, the procedure sets an efficient drive point (defined by the target rotation speed Ne2* and the target torque Te2*) of the engine EG2 and subsequently sets a drive point (defined by the target rotation speed Ne1* and the target torque Te1*) of the engine EG1 based on the target rotation speed Ne2* of the engine EG2, the rotation speed Nd of the driveshaft 65, and the gear ratios ρ1 and ρ2.

The drive control routine executed in the hybrid vehicle 20 of the first embodiment selects the first drive pattern or the second drive pattern based on the result of the determination of whether the vehicle speed V is not lower than the preset reference speed V1ref. One modified flow of the drive control routine may select the first drive pattern or the second drive pattern based on the result of the determination of whether the rotation speed Nm1 of the motor MG1 is lower than 0. Another modified flow of the drive control routine may select the first drive pattern or the second drive pattern to enhance the overall energy efficiency of the hybrid vehicle 20. In the latter modification of selecting the first drive pattern or the second drive pattern for the enhanced energy efficiency, one concrete procedure may experimentally or otherwise specify a changeover point of the efficient drive pattern between the first drive pattern and the second drive pattern and may change over the drive pattern from the first drive pattern to the second drive pattern at the specified changeover point. Any other suitable technique may be adopted to change over the drive pattern between the first drive point and the second drive point.

In the hybrid vehicle 20 of the first embodiment, the engine with no requirement for power output is stopped. The engine with no requirement for power output may, however, be driven under certain conditions (for example, may be idled).

In the configuration of the hybrid vehicle 20 of the first embodiment, the S1 axis, the C1-R2 axis, the R1-C2 axis, and the S2 axis are respectively connected to the motor MG1, to the engine EG1, to the engine EG2, and to the motor MG2 and the driveshaft 65. The configuration of the engines and the motors is, however, not restricted to this connection structure but may adopt another connection structure. There are six possible connection structures of connecting two engines and two motors with four different axes. The number of the possible connection structures is reduced to four on the assumption that the connection structure of sequentially connecting the engine, the engine, the motor, the motor is equivalent to the connection structure of sequentially connecting the motor, the motor, the engine, the engine and that the connection structure of sequentially connecting the engine, the motor, the engine, the motor is equivalent to the connection structure of sequentially connecting the motor, the engine, the motor, the engine. Connection of a motor with the driveshaft 65 in the remaining four connection structures eventually allows six options of the connection structure. The first embodiment regards one of these six options of the connection structure. FIG. 12 shows the remaining five connection structures. The axis with the symbol '*' represents connection of the driveshaft 65 to the axis. Like the first embodiment described above, any of these five connection structures allows the drive control with selection of an adequate drive pattern or drive mode among a first drive pattern with operation of one of the two engines, a second drive pattern with operation of the other of the two engines, a third drive pattern with operations of both the two engines, and a motor drive mode with no operation of either of the two engines. The drive control thus selects the suitable drive pattern (drive mode) to enhance the overall energy efficiency based on the rotation speed Nd and the torque demand Td of the driveshaft 65 in any of these five connection structures.

In the hybrid vehicle 20 of the first embodiment, the power distribution integration mechanism has the four axes as the four rotational elements by connection of the ring gear 32 of the first planetary gear P1 with the carrier 39 of the second planetary gear P2 and by connection of the carrier 34 of the first planetary gear P1 with the ring gear 37 of the second planetary gear P2. There are 18 combinations of respectively connecting two rotational elements selected among the three rotational elements of the planetary gear P1 with two rotational elements selected among the three rotational elements of the planetary gear P2. The first embodiment regards one of these 18 combinations. Any one of the remaining 17 combinations may be adopted to attain the four rotational elements of the power distribution integration mechanism. In the hybrid vehicle 20 of the first embodiment, the two planetary gears P1 and P2 are both single pinion planetary gears. One or both of the two planetary gears P1 and P2 may be a double pinion planetary gear. Namely connection of the two single pinion planetary gears in the first embodiment may be replaced by connection of one single pinion planetary gear with one double pinion planetary gear or by connection of two double pinion planetary gears. In the hybrid vehicle 20 of the first embodiment, the power distribution integration mechanism has the four rotational elements by connection of two sets of 3-element planetary gears. The planetary gears are, however, not essential but may be replaced by any other rotation means that rotate under the power balance. The power distribution integration mechanism may accordingly have four rotational elements by connection of two sets of 3-element rotation means under the power balance. In the hybrid vehicle 20 of the first embodiment, the power distribution integration mechanism has the four axes as the four rotational elements by connection of two rotational elements selected among the three rotational elements of the planetary gear P1 with two rotational elements selected among the three rotational elements of the planetary gear P2. Each planetary gear or another rotation means may have four rotational elements, instead of the three rotational elements.

B. Second Embodiment

Figure 13:
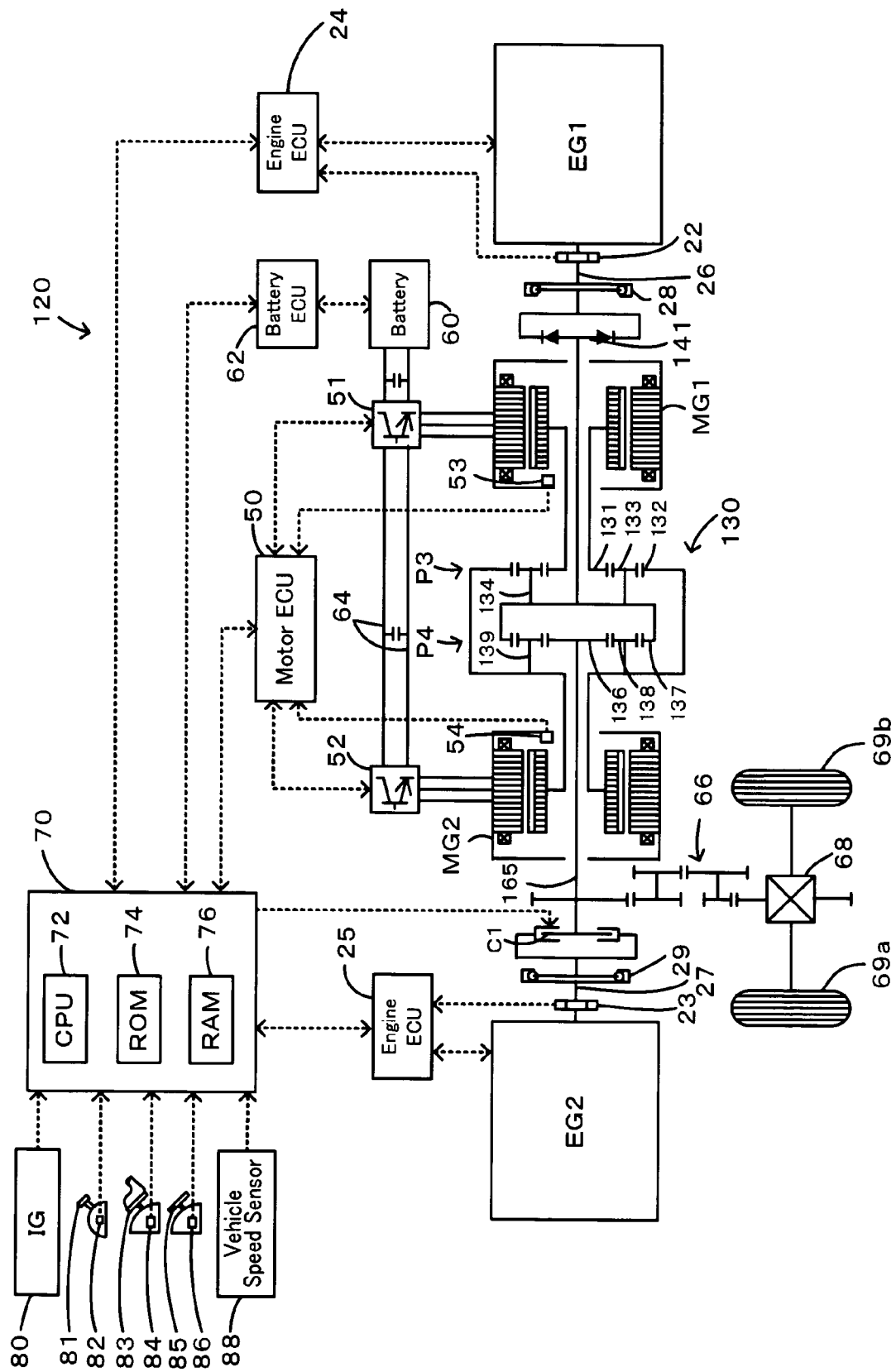
FIG. 13 schematically illustrates the configuration of another hybrid vehicle 120 equipped with a power output apparatus in a second embodiment of the invention.

FIG. 13 schematically illustrates the configuration of another hybrid vehicle 120 equipped with a power output apparatus in a second embodiment of the invention. The hybrid vehicle 120 of the second embodiment has the same configuration as that of the hybrid vehicle 20 of the first embodiment, except the structure of a power distribution integration mechanism 130. The like elements included in the hybrid vehicle 120 of the second embodiment to those of the hybrid vehicle 20 of the first embodiment are thus expressed by the like numerals and symbols and are not specifically described here.

As shown in FIG. 13, the power distribution integration mechanism 130 mounted on the hybrid vehicle 120 of the second embodiment includes two single pinion planetary gears P3 and P4, a clutch C1, and a one-way clutch 141. A sun gear 131, a ring gear 132, and a carrier 134 linked with a pinion gear 133 of the third planetary gear P3 are respectively connected to the rotating shaft of the motor MG1, to the rotating shaft of the motor MG2, and to the crankshaft 26 of the engine EG1 via the one-way clutch 141. A sun gear 136, a ring gear 137, and a carrier 139 linked with a pinion gear 138 of the fourth planetary gear P4 are respectively connected to the crankshaft 27 of the engine EG2 via the clutch C1, to the carrier 134 of the third planetary gear P3, and to the ring gear 132 of the third planetary gear P3. A driveshaft 165 connecting with the sun gear 136 of the fourth planetary gear P4 is linked to the drive wheels 69a and 69b via the gear mechanism 66 and the differential gear 68.

Like the hybrid vehicle 20 of the first embodiment, the hybrid vehicle 120 of the second embodiment having the above construction sets a drive torque demand Td* to be output to the driveshaft 165, based on the given vehicle speed V and the given accelerator opening Acc, which is equivalent to the driver's depression amount of the accelerator pedal 83, and drives and controls the engines EG1 and EG2 and the motors MG1 and MG2 to ensure output of a power demand equivalent to the preset drive torque demand Td* to the driveshaft 165. Like the first embodiment, there are several drive control modes of the engines EG1 and EG2 and the motors MG1 and MG2, that is, the torque conversion drive mode, the charge-discharge drive mode, and the motor drive mode.

Figure 14:
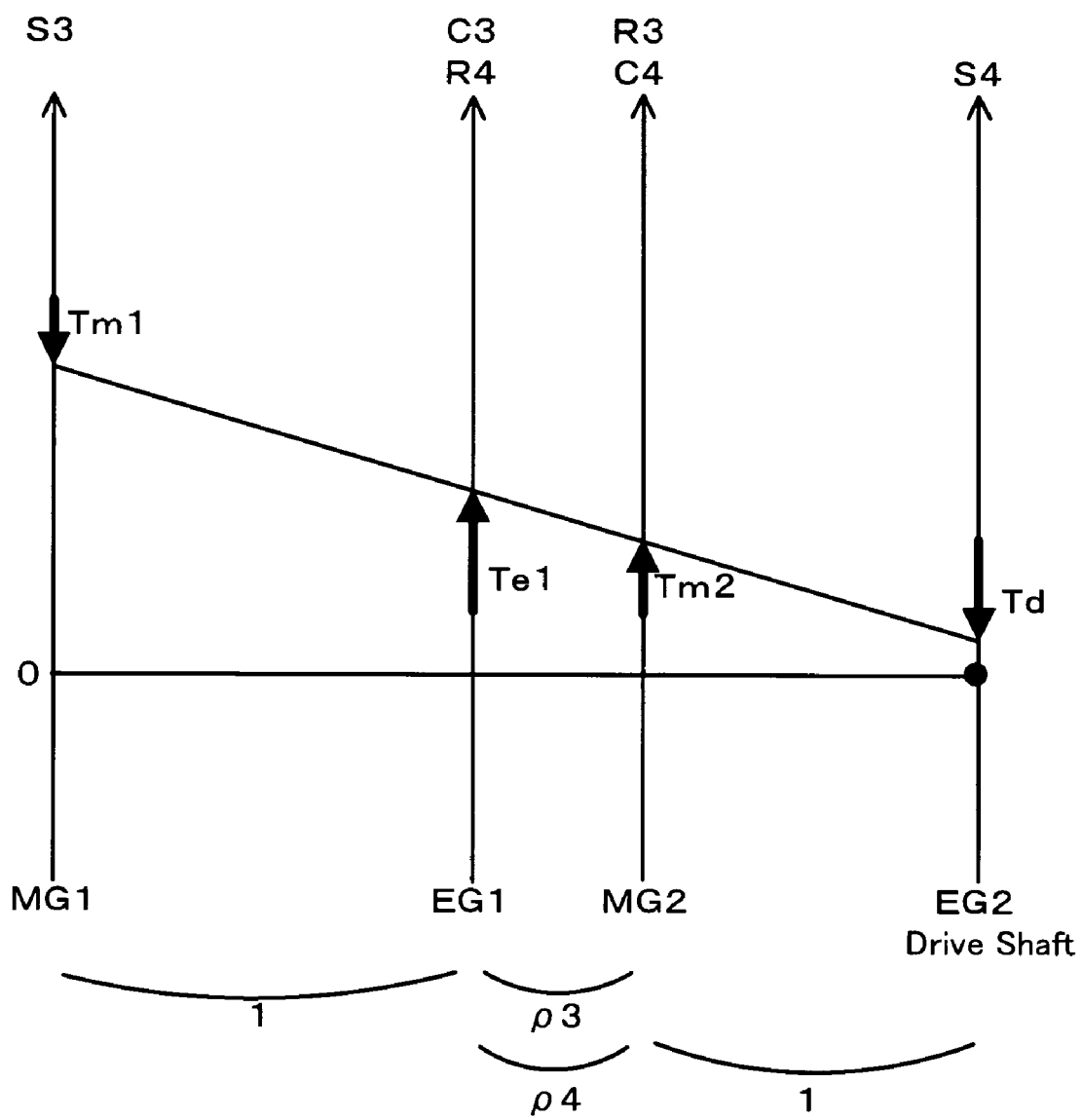
FIG. 14 is an alignment chart showing torque-rotation speed dynamics of respective rotation elements included in a power distribution integration mechanism 130 in a fourth drive pattern.

In the second embodiment, there are several different drive patterns to output the powers from the engine EG1 and EG2. In a fourth drive pattern, while the clutch C1 is set off to disconnect the engine EG2 from the driveshaft 165 and the engine EG2 stops its operation, the engine EG1 is driven to output the power that is subjected to torque conversion by means of the motors MG1 and MG2 and is transmitted to the driveshaft 165. In a fifth drive pattern, while the engine EG1 stops its operation, the clutch C1 is set on to connect the engine EG2 with the driveshaft 165 and to make the engine EG2 directly output the power to the driveshaft 165. In a sixth drive pattern, while the engine EG1 is driven to output the power that is subjected to torque conversion by means of the motors MG1 and MG2 and is transmitted to the driveshaft 165, the clutch C1 is set on to connect the engine EG2 with the driveshaft 165 and to make the engine EG2 directly output the power to the driveshaft 165. The fourth drive pattern is described with reference to the alignment chart of FIG. 14. The connection of the third planetary gear P3 with the fourth planetary gear P4 as described above attains the functions of a four element-type power distribution integration mechanism having four axes as its rotational elements like the first embodiment. An S3 axis on the left end represents the rotation speed of the sun gear 131 of the third planetary gear P3 that is equivalent to the rotation speed Nm1 of the motor MG1. A C3-R4 axis represents both the rotation speed of the carrier 134 of the third planetary gear P3, which is equivalent to the rotation speed Ne1 of the engine EG1, and the rotation speed of the ring gear 137 of the fourth planetary gear P4. An R3-C4 axis represents both the rotation speed of the ring gear 132 of the third planetary gear P3, which is equivalent to the rotation speed Nm2 of the motor MG2, and the rotation speed of the carrier 139 of the fourth planetary gear P4. An S4 axis on the right end represents the rotation speed of the sun gear 136 of the fourth planetary gear P4 that is equivalent to the rotation speed Nd of the driveshaft 165. In this alignment chart, ρ3 denotes a gear ratio of the third planetary gear P3 (=number of teeth on sun gear 131/number of teeth on ring gear 132), and ρ4 denotes a gear ratio of the fourth planetary gear P4 (=number of teeth on sun gear 136/number of teeth on ring gear 137). In the fourth drive pattern, the clutch C1 is set off to disconnect the engine EG2 from the sung gear 131 of the third planetary gear P3 (that is, from the driveshaft 165). The output power of the engine EG1 goes through torque conversion by means of the motors MG1 and MG2 and is transmitted to the driveshaft 165. The hybrid electronic control unit 70 takes charge of the on-off control of the clutch C1.

Figure 15:
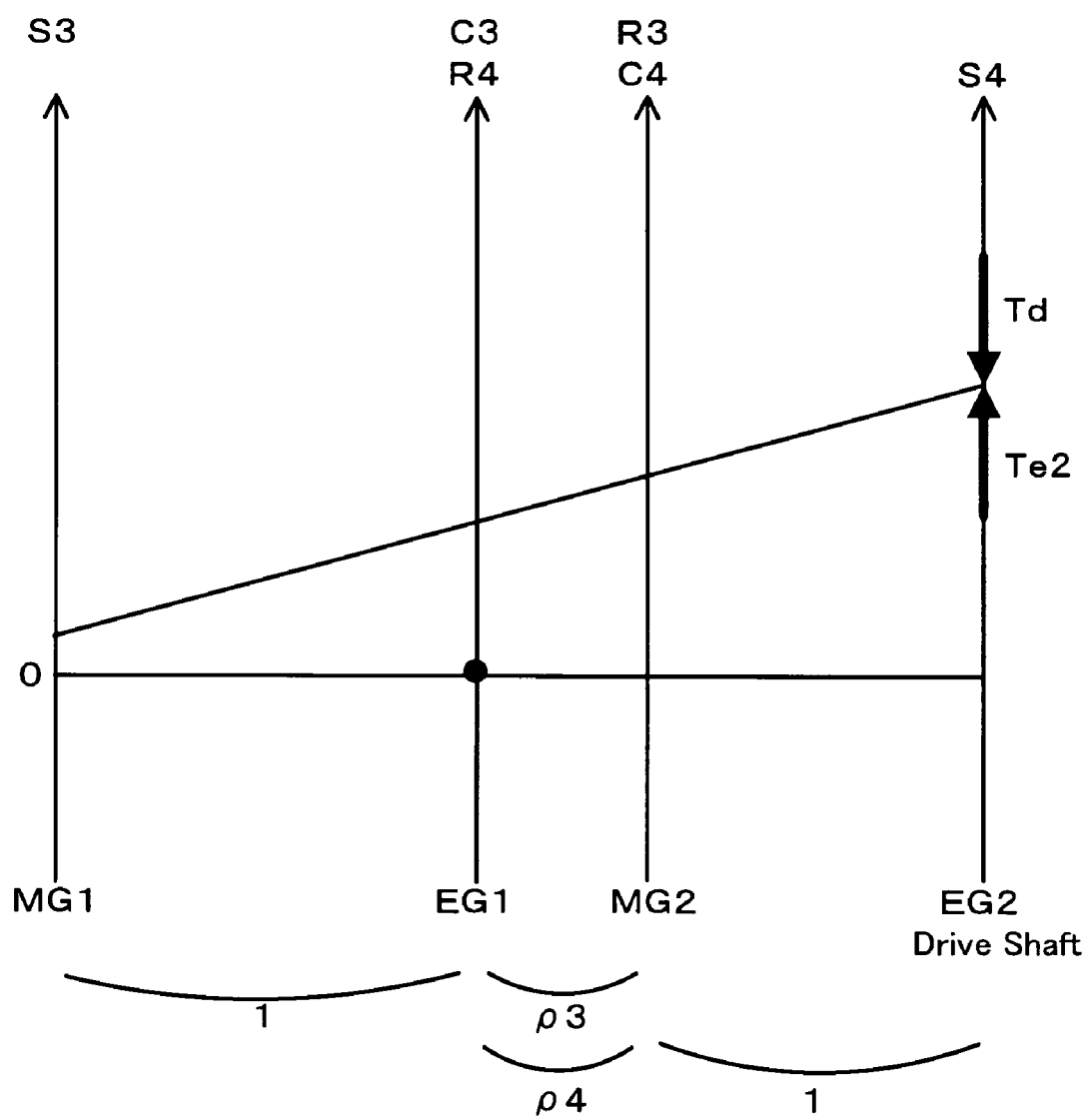
FIG. 15 is an alignment chart showing torque-rotation speed dynamics of the respective rotation elements included in the power distribution integration mechanism 130 in a fifth drive pattern.
Figure 16:
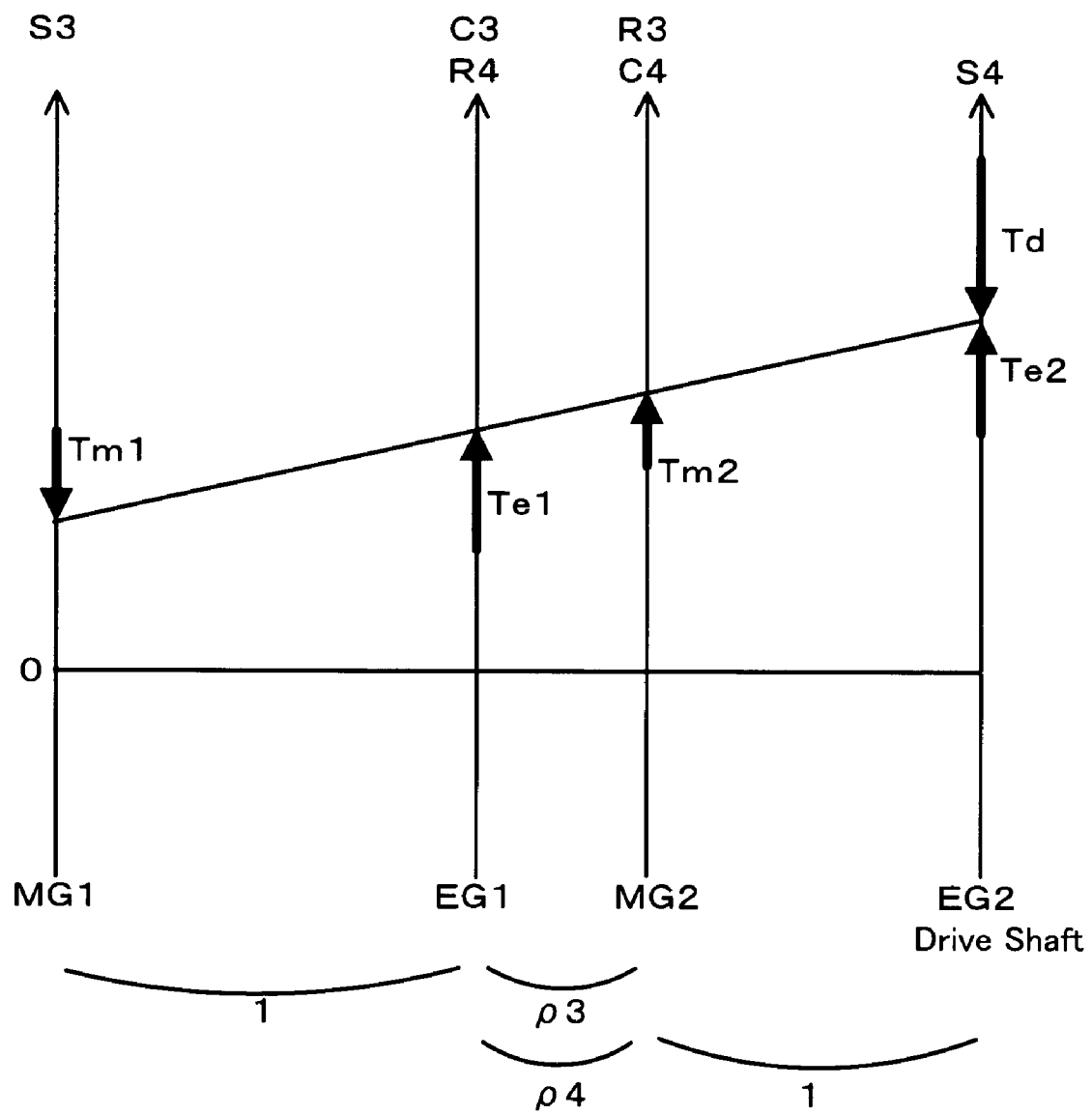
FIG. 16 is an alignment chart showing torque-rotation speed dynamics of the respective rotation elements included in the power distribution integration mechanism 130 in a sixth drive pattern.
Figure 17:
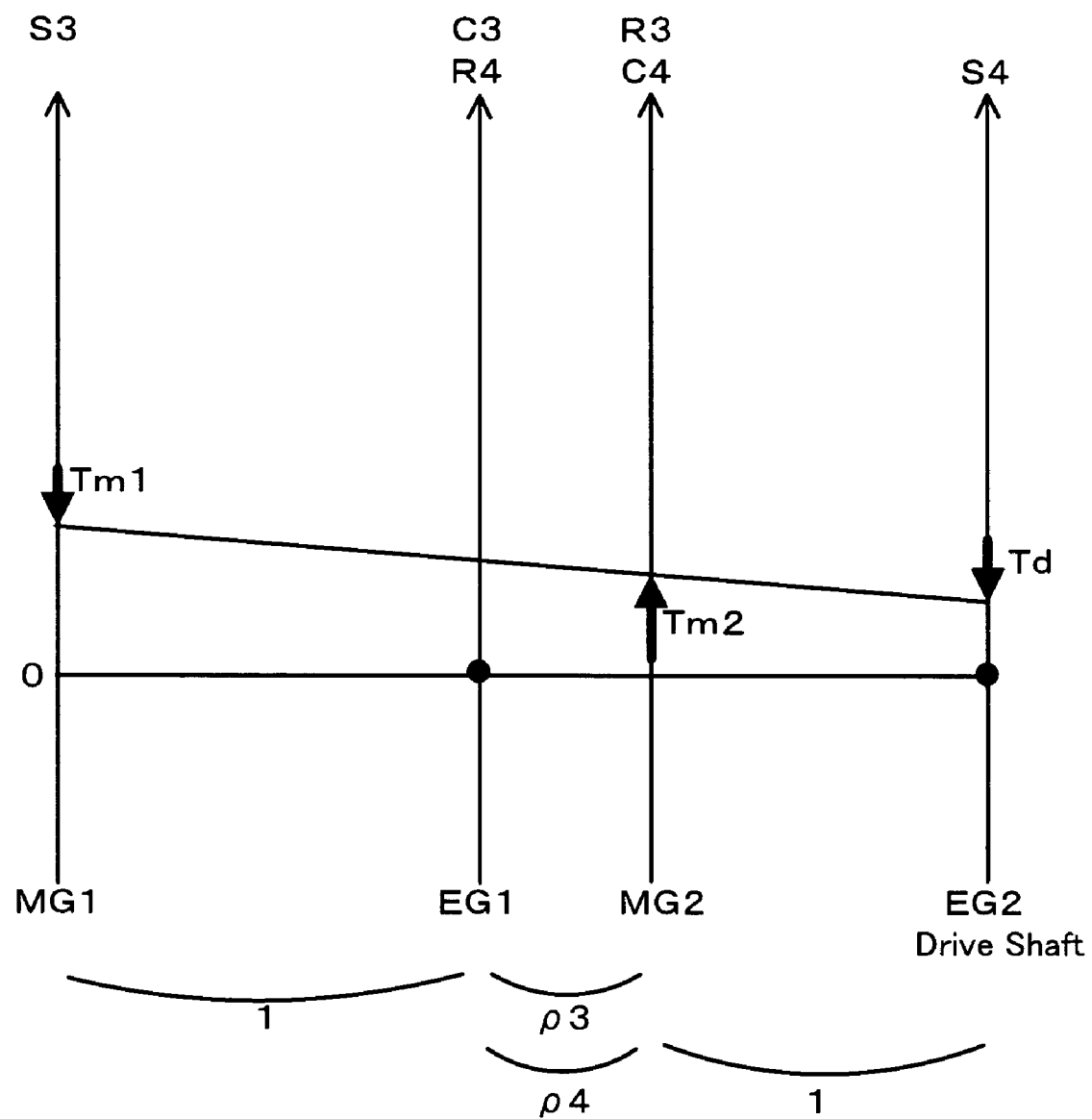
FIG. 17 is an alignment chart showing torque-rotation speed dynamics of the respective rotation elements included in the power distribution integration mechanism 130 in a motor drive mode.

The fifth drive pattern is shown in the alignment chart of FIG. 15. In the fifth drive pattern, while the engine EG1 stops its operation, the clutch C1 is set onto connect the engine EG2 with the driveshaft 165 and to make the engine EG2 directly output the power to the driveshaft 165. The sixth drive pattern is shown in the alignment chart of FIG. 16. In the sixth drive pattern, while the engine EG1 is driven to output the power that is subjected to torque conversion by means of the motors MG1 and MG2 and is transmitted to the driveshaft 165, the clutch C1 is set on to connect the engine EG2 with the driveshaft 165 and to make the engine EG2 directly output the power to the driveshaft 165 as in the fifth drive pattern. In the motor drive mode shown in the alignment chart of FIG. 17, while the clutch C1 is set off to disconnect the engine EG2 from the driveshaft 165 and both the engines EG1 and EG2 stop their operations, the motors MG1 and MG2 are driven to output the power to the driveshaft 165.

The respective drive patterns have different characteristics as described below. At a start of the hybrid vehicle, the rotation speed Nd of the driveshaft 165 is equal to 0, so that the fifth drive pattern and the sixth drive pattern are unselectable to set the clutch C1 on for connecting the engine EG2 with the driveshaft 165 and making the engine EG2 output the power to the driveshaft 165. At the start of the hybrid vehicle, the fourth drive pattern is accordingly selected to cause the power of the efficiently-driven engine EG1 to go through torque conversion by means of the motors MG1 and MG2 and to be output to the driveshaft 165. Namely the fourth drive pattern is suitably applied for a start of the hybrid vehicle or during a low-speed drive. After the start of the vehicle, the rotation speed Nd of the driveshaft 165 gradually increases to a level that allows efficient operation of the engine EG2. When a relatively low torque is required for the driveshaft 165, the fifth drive pattern is selected to set the clutch C1 on to directly output the power of the efficiently-driven engine EG2 to the driveshaft 165. This enhances the overall energy efficiency, compared with the drive pattern accompanied with torque conversion by means of the motors MG1 and MG2. Namely the fifth drive pattern is advantageous during a medium-speed or high-speed drive. When a relatively high torque is required for the driveshaft 165, on the other hand, the sixth drive pattern is selected to operate both the engines EG1 and EG2. In the sixth drive pattern, the power of the engine EG1 goes through the torque conversion by means of the motors MG1 and MG2 and is output to the driveshaft 165, in addition to the power output from the engine EG2 in the fifth drive pattern. This ensures output of a high torque to the driveshaft 165.

Figure 18:
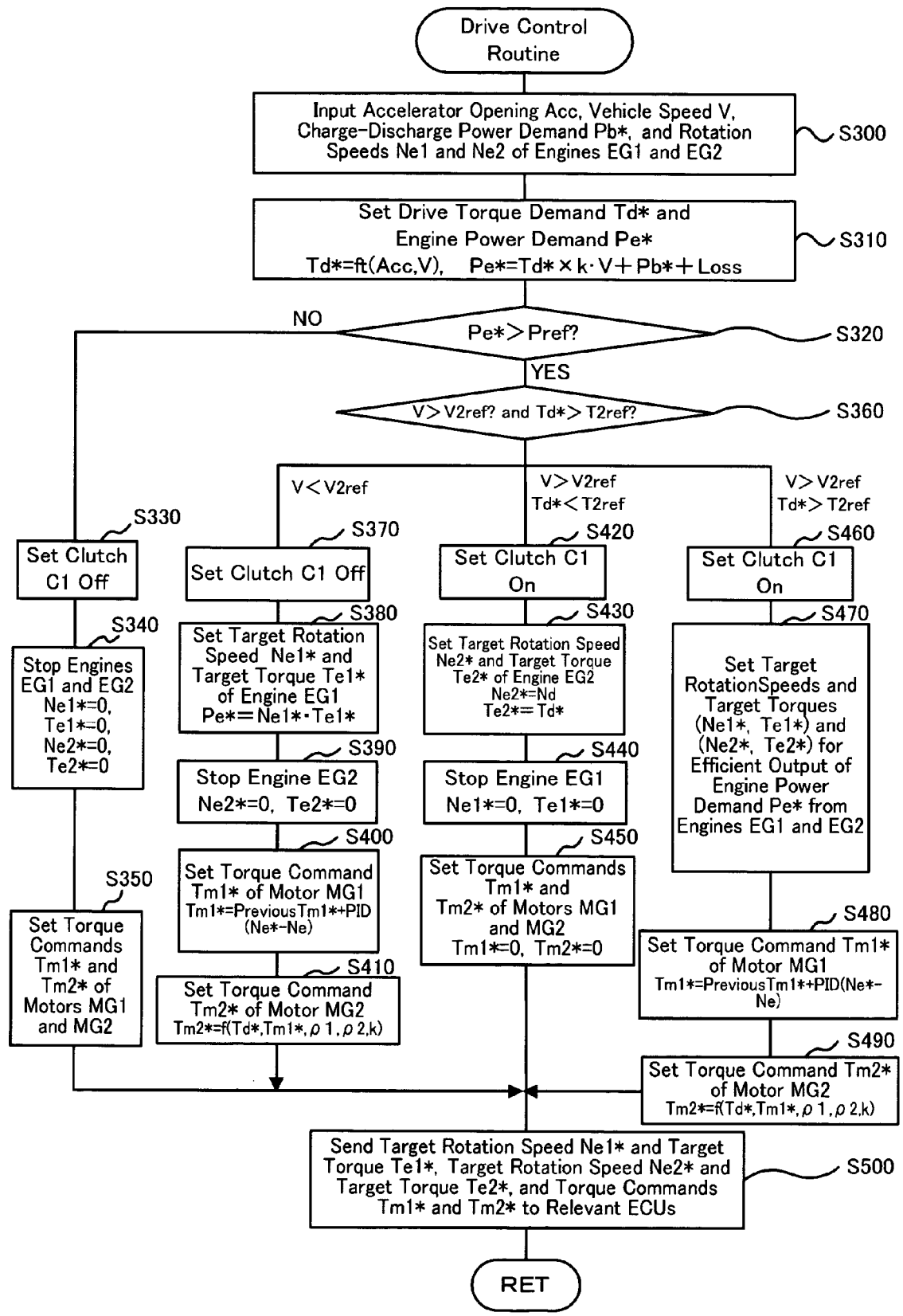
FIG. 18 is a flowchart showing a drive control routine executed by the hybrid electronic control unit 70 in the second embodiment.

The description regards the operations of the hybrid vehicle 120 of the second embodiment having the configuration discussed above. FIG. 18 is a flowchart showing a drive control routine executed by the hybrid electronic control unit 70 in the hybrid vehicle 120 of the second embodiment. This drive control routine is repeatedly executed at preset time intervals (for example, at every 8 msec).

In the drive control routine, the CPU 72 of the hybrid electronic control unit 70 inputs the required data for control, that is, the accelerator opening Acc, the vehicle speed V, the rotation speeds Ne1 and Ne2 of the engines EG1 and EG2, and the charge-discharge electric power Pb* (step S300) and sets a drive torque demand Td* to be output to the driveshaft 165 and an engine power demand Pe* to be output from the engines EG1 and EG2, based on the input accelerator opening Acc and the input vehicle speed V (step S310). The processing of steps S300 and S310 is equal to the processing of steps S100 and S110 in the drive control routine of the first embodiment shown in FIG. 8.

Figure 19:
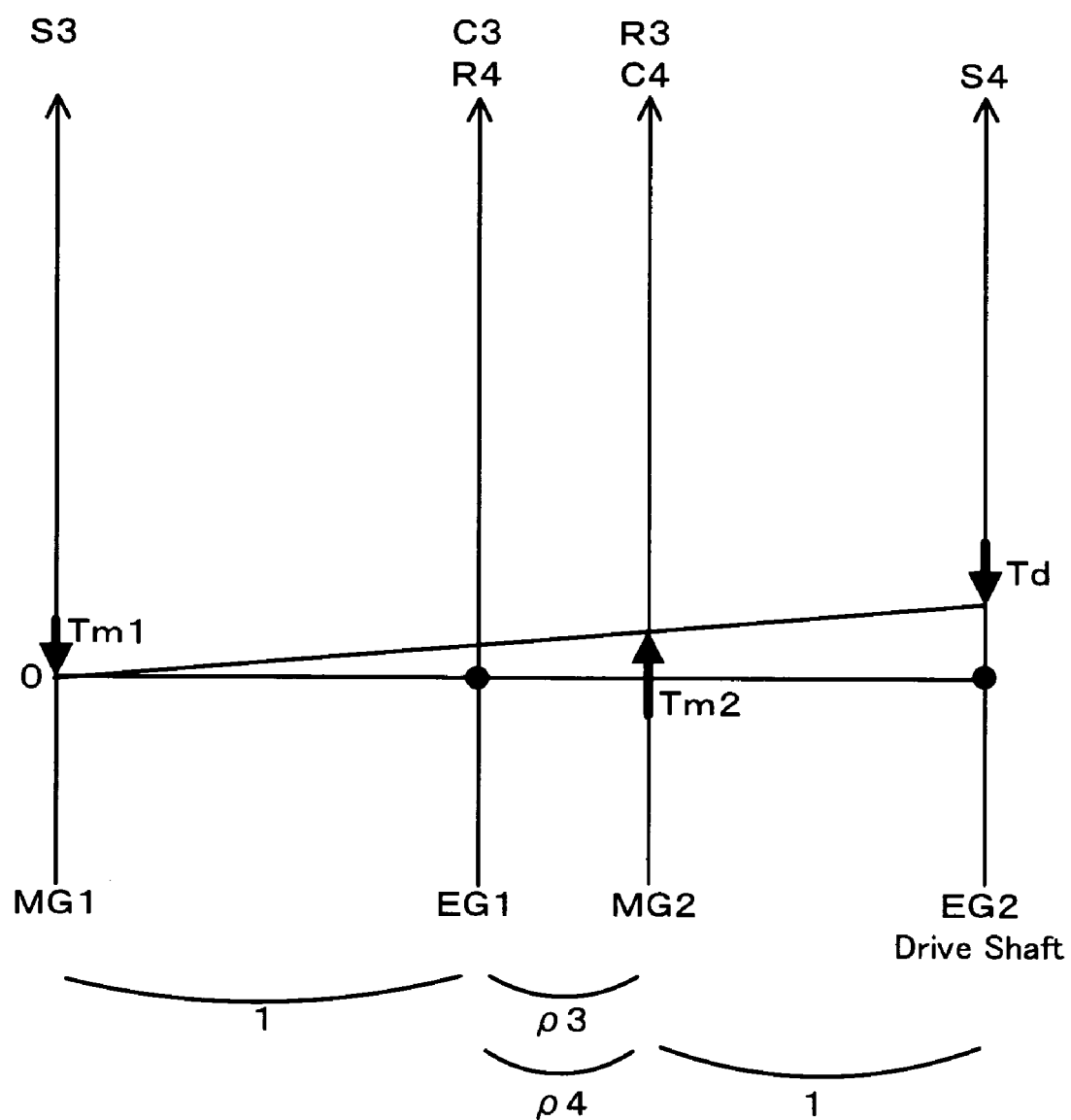
FIG. 19 shows a process of setting torque commands Tm1* and Tm2* of motors in the motor drive mode.

Comparison between the engine power demand Pe* and the preset reference value Pref determines the requirement or non-requirement for selection of the motor drive mode (step S320). When the engine power demand Pe* is less than the preset reference value Pref, selection of the motor drive mode is adequate for the current state. The CPU 72 accordingly sets the clutch C1 off (step S330), sets 0 to all the target rotation speeds Ne1* and Ne2* and the target torques Te1* and Te2* of the engines EG1 and EG2 to stop the operations of the engines EG1 and EG2 (step S340), and sets the torque commands Tm1* and Tm2* of the motors MG1 and MG2 (step S350). The procedure of this embodiment sets the torque command Tm1* to make the rotation speed Nm1 of the motor MG1 equal to 0, while setting the torque command Tm2* to enable application of the output torque from the motor MG2 to the driveshaft 165. This process is shown in the alignment chart of FIG. 19. Setting the torque commands Tm1* and Tm2* of the motors MG1 and MG2 in this manner enables the torque Tm2* output from the motor MG2 to go through torque conversion and to be output to the driveshaft 165. Setting the torque command Tm1* to make the rotation speed Nm1 of the motor MG1 equal to 0 reduces the power consumption of the motor MG1 to zero.

After setting the target rotation speeds Ne1* and Ne2* and the target torques Te1* and Te2* of the engines EG1 and EG2 and the torque commands Tm1* and Tm2* of the motors MG1 and MG2, the drive control routine is terminated after sending the target rotation speeds Ne1* and Ne2* and the target torques Te1* and Te2* of the engines EG1 and EG2 to the engine ECUs 24 and 25 and sending the torque commands Tm1* and Tm2* of the motors MG1 and MG2 to the motor ECU 50 (step S500). The engine ECUs 24 and 25 and the motor ECU 50 then perform the respective control operations as described previously.

When the engine power demand Pe* is not less than the preset reference value Pref, on the other hand, the CPU 72 sequentially compares the vehicle speed V with a preset reference speed V2ref and the drive torque demand Td* with a preset reference torque T2ref (step S360). The reference speed V2ref and the reference torque T2ref are threshold values used for selection of an adequate drive pattern. The reference speed V2ref is used as a criterion for identifying the requirement for the on-setting of the clutch C1 to enable direct output of the power from the engine EG2 to the driveshaft 165. The reference torque T2ref is used as a criterion for identifying the requirement for output of the power from both of the engines EG1 and EG2. When the vehicle speed V is lower than the preset reference speed V2ref, for example, at a start or during a low-speed drive of the hybrid vehicle, the current state is specified to require a certain level of torque. The CPU 72 accordingly selects the fourth drive pattern and sets the clutch C1 off (step S370). The CPU 72 then sets the target rotation speed Ne1* and the target torque Te1* of the engine EG1 according to an efficient operation curve for efficient operation of the engine EG1 and a curve of constant engine power demand Pe* (step S380), and sets 0 to both the target rotation speed Ne2* and the target torque Te2* of the engine EG2 in order to stop the operation of the engine EG2 (step S390). The processing of steps S380 and S390 is similar to the processing of steps S180 and S190 in the drive control routine of the first embodiment shown in FIG. 8. The torque command Tm1* of the motor MG1 is calculated from the target rotation speed Ne1* and the current rotation speed Ne1 of the engine EG1 according to Equation (3) given above (step S400). The torque command Tm2* of the motor MG2 is then calculated from the drive torque demand Td*, the calculated torque command Tm1* of the motor MG1, the gear ratios ρ1 and ρ2, and the distribution rate k according to Equation (4) given above (step 410). The drive control routine is terminated after sending the target rotation speeds Ne1* and Ne2* and the target torques Te1* and Te2* of the engines EG1 and EG2 and the torque commands Tm1* and Tm2* of the motors MG1 and MG2 to the relevant ECUs (step S500). This drive control desirably enhances the energy efficiency of the hybrid vehicle during a relatively low-speed drive.

When the vehicle speed V is not lower than the preset reference speed V2ref and when the drive torque demand Td* is less than the preset reference torque T2ref, for example, during a medium-speed or high-speed cruise drive, the current state is specified as the efficient operation state of the engine EG2. The CPU 72 accordingly selects the fifth drive pattern and sets the clutch C1 on (step S420). The CPU 72 then sets the rotation speed Nd of the driveshaft 165 and the drive torque demand Td*respectively to the target rotation speed Ne2* and the target torque Te2* of the engine EG2 (step S430), sets 0 to both the target rotation speed Ne1* and the target torque Te1* of the engine EG1 in order to stop the operation of the engine EG1 (step S440), and sets 0 to both the torque commands Tm1* and Tm2* of the motors MG1 and MG2 (step S450). The drive control routine is terminated after sending the target rotation speeds Ne1* and Ne2* and the target torques Te1* and Te2* of the engines EG1 and EG2 and the torque commands Tm1* and Tm2* of the motors MG1 and MG2 to the relevant ECUs (step S500). This drive control desirably enhances the energy efficiency of the hybrid vehicle during a medium-speed or high-speed drive.

When the vehicle speed V is not lower than the preset reference speed V2ref and when the drive torque demand Td* is not less than the preset reference torque T2ref, the current state is specified to require output of the power from both of the engines EG1 and EG2. The CPU 72 accordingly selects the sixth drive pattern and sets the clutch C1 on (step S460). The CPU 72 then sets the target rotation speeds Ne1* and Ne2* and the target torques Te1* and Te2* of the engines EG1 and EG2 according to the engine power demand Pe* (step S470). The concrete procedure of setting the target rotation speeds Ne1* and Ne2* and the target torques Te1* and Te2* of the engines EG1 and EG2 in this embodiment first sets the rotation speed Nd of the driveshaft 165 to the target rotation speed Ne2* of the engine EG2, and sets the target torque Te2* of the engine EG2 based on an efficient operation curve of the engine EG2 and the target rotation speed Ne2*. The procedure then multiplies the target rotation speed Ne2* by the target torque Te2* to calculate a power demand division Pe2* (=Ne2*×Te2*) to be output from the engine EG2 and subtracts the calculated power demand division Pe2* from the engine power demand Pe* to obtain a power demand division Pe1* to be output from the engine EG1. The procedure subsequently sets the target rotation speed Ne1* and the target torque Te1* of the engine EG1 based on an efficient operation curve of the engine EG1 and the calculated power demand division Pe1*. Such setting of the target rotation speed Ne1* and Ne2* and the target torques Te1* and Te2* of the engines EG1 and EG2 enables efficient operations of the engines EG1 and EG2 and enhances the overall energy efficiency of the whole hybrid vehicle. The reference torque T2ref used for the comparison with the drive torque demand Td* is set to enable such operations of the engines EG1 and EG2.

The CPU 72 then calculates the torque commands Tm1* and Tm2* of the motors MG1 and MG2 (steps S480 and S490) in the same manner as the calculation of the torque commands Tm1* and Tm2* of the motors MG1 and MG2 in the fourth drive pattern. The drive control routine is terminated after sending the target rotation speeds Ne1* and Ne2* and the target torques Te1* and Te2* of the engines EG1 and EG2 and the torque commands Tm1* and Tm2* of the motors MG1 and MG2 to the relevant ECUs (step S500).

As described above, the hybrid vehicle 120 of the second embodiment is under drive control with adequate selection of the drive mode or the drive pattern among the fourth drive pattern, the fifth drive pattern, the sixth drive pattern, and the motor drive mode. In the fourth drive pattern, while the engine EG2 stops its operation, the power of the engine EG1 is output to the driveshaft 165. In the fifth drive pattern, while the engine EG1 stops its operation, the power of the engine EG2 is directly output to the driveshaft 165. In the sixth drive pattern, the powers of both the engines EG1 and EG2 are output to the driveshaft 165. In the motor drive mode, while both the engines EG1 and EG2 stop their operations, the powers of both the motors MG1 and MG2 are output to the driveshaft 165. The hybrid vehicle 120 of the second embodiment is thus under drive control with selection of the drive pattern (drive mode) to maximize the overall energy efficiency based on the rotation speed Nd and the torque demand Td of the driveshaft 165.

The hybrid vehicle 120 of the second embodiment selects the fourth drive pattern at its start. In the fourth drive pattern, while the engine EG2 is at a stop, the power of the engine EG1 driven at the efficient drive point goes through torque conversion by means of the motors MG1 and MG2 and is output to the driveshaft 165. Such drive control enables the hybrid vehicle 120 to be driven with the output power of the engine EG1, even when the low rotation speed Nd of the driveshaft 165 does not allow the operation of the engine EG2. The hybrid vehicle 120 of the second embodiment selects the fifth drive pattern in response to a requirement of a relatively low torque for the driveshaft 165 at a vehicle speed of ensuring the efficient operation of the engine EG2. In the fifth drive pattern, while the engine EG1 is at a stop, the power of the engine EG2 driven at the efficient drive point is directly output to the driveshaft 165. This effectively enhances the overall energy efficiency of the whole hybrid vehicle 120. In response to a requirement of a relatively high torque for the driveshaft 165, the hybrid vehicle 120 of the second embodiment selects the sixth drive pattern. In the sixth drive pattern, the total power of the engines EG1 and EG2 driven at the efficient drive points is output to the driveshaft 165. This ensures output of a high torque to the driveshaft 165. The hybrid vehicle 120 of the second embodiment selects the motor drive mode when the rotation speed Nd and the torque demand Td of the driveshaft 165 are relatively low and the battery 60 has a sufficient margin in its state of charge SOC. In the motor drive mode, while the engines EG1 and EG2 stop their operations, the hybrid vehicle 120 is driven with the power output to the driveshaft 165 by application of torques from the motors MG1 and MG2.

When the vehicle speed V is not lower than the preset reference speed V2ref and when the drive torque demand Td* is less than the preset reference torque T2ref, the hybrid vehicle 120 of the second embodiment selects the fifth drive pattern. One modified flow of drive control may select the fourth drive pattern when the vehicle speed V is not lower than a preset threshold value V3ref that is higher than the preset reference speed V2ref, for example, during a high-speed cruise drive. During the high-speed cruise drive, the rotation speed Nd of the driveshaft 165 is relatively high, while the drive torque demand Td* is relatively low. Selection of the fifth drive pattern under such conditions causes the engine EG2 to be driven in a high rotation speed-low torque range and lowers the energy efficiency of the engine EG2. In the fourth drive pattern, on the other hand, the power of the efficiently-driven engine EG1 goes through torque conversion by means of the motors MG1 and MG2 and is output to the driveshaft 165. The overall energy efficiency in the fourth drive pattern even with some potential low in energy conversion by the motors MG1 and MG2 may be still higher than the overall energy efficiency in the fifth drive pattern. Because of this reason, the fourth drive pattern may be selected during a high-speed cruise drive. Selection between the fourth drive pattern and the fifth drive pattern may depend upon the overall energy efficiency or another relevant factor, instead of the vehicle speed V.

In the hybrid vehicle 120 of the second embodiment, the engine with no requirement for power output is stopped, as in the hybrid vehicle 20 of the first embodiment. The engine with no requirement for power output may, however, be driven under certain conditions (for example, may be idled).

In the configuration of the hybrid vehicle 120 of the second embodiment, the S1 axis, the C1-R2 axis, the R1-C2 axis, and the S2 axis are respectively connected to the motor MG1, to the engine EG2, to the motor MG2, and to the engine EG2 and the driveshaft 65. The configuration of the engines and the motors is, however, not restricted to this connection structure but may adopt another connection structure. There are four possible connection structures of connecting two engines and two motors with four different axes as described in the first embodiment. Connection of an engine with the driveshaft 165 in these four connection structures eventually allows six options of the connection structure. The second embodiment regards one of these six options of the connection structure. FIG. 20 shows the remaining five connection structures. The axis with the symbol '*' represents connection of the driveshaft 165 to the axis. Like the second embodiment described above, any of these five connection structures allows the drive control with selection of an adequate drive pattern or drive mode among a fourth drive pattern with operation of one of the two engines, a fifth drive pattern with operation of the other of the two engines, a sixth drive pattern with operations of both the two engines, and a motor drive mode with no operation of either of the two engines. The drive control thus selects the suitable drive pattern (drive mode) to enhance the overall energy efficiency based on the rotation speed Nd and the torque demand Td of the driveshaft 165 in any of these five connection structures.

In the hybrid vehicle 120 of the second embodiment, the power distribution integration mechanism has the four axes as the four rotational elements by connection of the ring gear 132 of the third planetary gear P3 with the carrier 139 of the fourth planetary gear P4 and by connection of the carrier 134 of the third planetary gear P3 with the ring gear 137 of the fourth planetary gear P4, as in the hybrid vehicle 20 of the first embodiment. There are 18 combinations of respectively connecting two rotational elements selected among the three rotational elements of the planetary gear P3 with two rotational elements selected among the three rotational elements of the planetary gear P4. The second embodiment regards one of these 18 combinations. Any one of the remaining 17 combinations may be adopted to attain the four rotational elements of the power distribution integration mechanism. In the hybrid vehicle 120 of the second embodiment, the two planetary gears P3 and P4 are both single pinion planetary gears. One or both of the two planetary gears P3 and P4 may be a double pinion planetary gear. Namely connection of the two single pinion planetary gears in the first embodiment may be replaced by connection of one single pinion planetary gear with one double pinion planetary gear or by connection of two double pinion planetary gears. In the hybrid vehicle 120 of the second embodiment, the power distribution integration mechanism has the four rotational elements by connection of two sets of 3-element planetary gears. The planetary gears are, however, not essential but may be replaced by any other rotation means that rotate under the power balance. The power distribution integration mechanism may accordingly have four rotational elements by connection of two sets of 3-element rotation means under the power balance. In the hybrid vehicle 120 of the second embodiment, the power distribution integration mechanism has the four axes as the four rotational elements by connection of two rotational elements selected among the three rotational elements of the planetary gear P3 with two rotational elements selected among the three rotational elements of the planetary gear P4. Each planetary gear or another rotation means may have four rotational elements, instead of the three rotational elements.

The embodiments and their modifications described above regard the motor vehicle equipped with the power output apparatus of the invention that includes the engines EG1 and EG2, the motors MG1 and MG2, and the power distribution integration mechanism 30 or 130 and outputs power to the driveshaft 65 or 165. The power output apparatus of the invention may be mounted on not only the motor vehicles but any other moving bodies including diverse vehicles, ships and boats, and aircraft. The power output apparatus of the invention may also be used as the power source of stationary equipment, such as construction machinery.

The embodiment discussed above is to be considered in all aspects as illustrative and not restrictive. There may be many modifications, changes, and alterations without departing from the scope or spirit of the main characteristics of the present invention. All changes within the meaning and range of equivalency of the claims are intended to be embraced therein.

INDUSTRIAL APPLICABILITY

The technique of the invention is preferably applied to the manufacturing industries of the power output apparatuses and the motor vehicles equipped with the power output apparatuses.

The invention claimed is:

1. A power output apparatus that outputs power to a driveshaft, said power output apparatus comprising:
   a first internal combustion engine;
   a second internal combustion engine;
   a first motor;
   a second motor; and
   a multi-axes-type power input output mechanism that has multiple axes including four axes, that is, a first axis linked to an output shaft of the first internal combustion engine, a second axis linked to an output shaft of the second internal combustion engine, a third axis linked to a rotating shaft of the first motor, and a fourth axis linked to a rotating shaft of the second motor,
   where one of the four axes is connected to the driveshaft, rotations of two of the four axes depend upon rotation speeds of remaining two axes of the four axes, and at least part of powers of the first internal combustion engine, the second internal combustion engine, the first motor, and the second motor are output to the driveshaft with balance of powers input to and output from the multiple axes.

2. A power output apparatus in accordance with claim 1, where the driveshaft is connected with either one of the third axis and the fourth axis of said multi-axes-type power input output mechanism.

3. A power output apparatus in accordance with claim 1, where the driveshaft is connected with either one of the first axis and the second axis of said multi-axes-type power input output mechanism.

4. A power output apparatus in accordance with claim 1, wherein said multi-axes-type power input output mechanism comprises a first connection-disconnection mechanism that connects and disconnects the first axis with and from the output shaft of the first internal combustion engine, and a second connection-disconnection mechanism that connects and disconnects the second axis with and from the output shaft of the second internal combustion engine.

5. A power output apparatus in accordance with claim 4, wherein at least one of the first connection-disconnection mechanism and the second connection-disconnection mechanism is a one-way clutch.

6. A power output apparatus in accordance with claim 1, wherein said multi-axes-type power input output mechanism has the four axes arranged such that the axis connected to the driveshaft is rotated at either a maximum rotation speed or a minimum rotation speed among rotation speeds of the four axes.

7. A power output apparatus in accordance with claim 1, wherein said multi-axes-type power input output mechanism has the four axes arranged such that the axis connected to the driveshaft is rotated at neither a maximum rotation speed nor a minimum rotation speed among rotation speeds of the four axes.

8. A power output apparatus in accordance with claim 1, said power output apparatus further comprising:
a power demand setting module that sets a power demand required for the driveshaft, in response to an operator's operation; and
a control module that controls the first internal combustion engine, the second internal combustion engine, the first motor, the second motor, and said multi-axes-type power input output mechanism to output a power equivalent to the set power demand to the driveshaft.

9. A power output apparatus in accordance with claim 8, said power output apparatus further comprising:
an accumulator unit that transmits electric power to and from the first motor and the second motor,
wherein said control module changes over a working control mode among a first control mode, a second control mode, a third control mode, and a fourth control mode to output the power equivalent to the set power demand to the driveshaft,
the first control mode making control to ensure output of the power equivalent to the set power demand to the driveshaft without using the power of the first internal combustion engine but with using the power of the second internal combustion engine,
the second control mode making control to ensure output of the power equivalent to the set power demand to the driveshaft without using the power of the second internal combustion engine but with using the power of the first internal combustion engine,
the third control mode making control to ensure output of the power equivalent to the set power demand to the driveshaft with using the powers of both the first internal combustion engine and the second internal combustion engine,
the fourth control mode making control to ensure output of the power equivalent to the set power demand to the driveshaft without using neither of the powers of the first internal combustion engine and the second internal combustion engine.

10. A power output apparatus in accordance with claim 9, wherein said control module stops operation of the internal combustion engine, which is not used for the power output, in the first control mode or in the second control mode.

11. A power output apparatus in accordance with claim 9, wherein said control module selects one of the first control mode, the second control mode, the third control mode, and the fourth control mode based on the set power demand and makes control to ensure output of the power equivalent to the set power demand to the driveshaft.

12. A power output apparatus in accordance with claim 8, wherein said control module controls the first internal combustion engine, the second internal combustion engine, the first motor, the second motor, and said multi-axes-type power input output mechanism to ensure efficient output of the power equivalent to the set power demand to the driveshaft.

13. A power output apparatus in accordance with claim 1, wherein said multi-axes-type power input output mechanism comprises a first planetary gear unit having three rotational elements and a second planetary gear unit having three rotational elements,
where any two rotational elements of the three rotational elements in the second planetary gear unit are respectively connected with any two rotational elements of the three rotational elements in the first planetary gear unit, and
the four axes of said multi-axes-type power input output mechanism include one axis connected to a remaining rotational element of the three rotational elements of the second planetary gear unit, which is not connected with any of the three rotational elements of the first planetary gear unit, and three axes connected to the three rotational elements of the first planetary gear unit.

14. A motor vehicle, said motor vehicle comprising:
a first internal combustion engine;
a second internal combustion engine;
a first motor;
a second motor; and
a multi-axes-type power input output mechanism that has multiple axes including four axes, that is, a first axis linked to an output shaft of the first internal combustion engine, a second axis linked to an output shaft of the second internal combustion engine, a third axis linked to a rotating shaft of the first motor, and a fourth axis linked to a rotating shaft of the second motor,
where one of the four axes is connected to a driveshaft coupled with an axle, rotations of two of the four axes depend upon rotation speeds of remaining two axes of the four axes, and at least part of powers of the first internal combustion engine, the second internal combustion engine, the first motor, and the second motor are output to the driveshaft with balance of powers input to and output from the multiple axes.

* * * * *

UNITED STATES PATENT AND TRADEMARK OFFICE
CERTIFICATE OF CORRECTION

PATENT NO. : 7,317,259 B2
APPLICATION NO. : 10/589494
DATED : January 8, 2008
INVENTOR(S) : Tomokazu Yamauchi It is certified that error appears in the above-identified patent and that said Letters Patent is hereby corrected as shown below:

| Column | Line | |
|---|---|---|
| 2 | 4 | After "apparatus" insert --that--. |
| 3 | 42 | Change "makes control" to --takes control--. |
| 3 | 46 | Change "makes control" to --takes control--. |
| 3 | 50 | Change "makes" to --takes--. |
| 3 | 52 | After "driveshaft" delete "with". |
| 3 | 54 | Change "makes" to --takes--. |
| 3 | 56 | Change "neither" to --either--. |
| 3 | 57 | After "engine" change "and" to --or--. |
| 4 | 4 | Change "makes control" to --takes control--. |
| 4 | 30 | Change "anyone" to --any one--. |

UNITED STATES PATENT AND TRADEMARK OFFICE
CERTIFICATE OF CORRECTION

PATENT NO. : 7,317,259 B2
APPLICATION NO. : 10/589494
DATED : January 8, 2008
INVENTOR(S) : Tomokazu Yamauchi It is certified that error appears in the above-identified patent and that said Letters Patent is hereby corrected as shown below:

| Column | Line | |
|---|---|---|
| 19 | 1 | Change "onto" to --on to--. |
| 25 | 57 | Change "making control" to --taking control--. |
| 25 | 60 | Before "using" delete "with". |
| 25 | 62 | Change "making control" to --taking control--. |
| 25 | 65 | Before "using" delete "with". |
| 26 | 1 | Change "making control" to --taking control--. |
| 26 | 3 | Before "using" delete "with". |
| 26 | 6 | Change "making control" to --taking control--. |
| 26 | 8 | Change "neither" to --either--. |
| 26 | 9 | Change "and" to --or--. |

Signed and Sealed this

Second Day of December, 2008

JON W. DUDAS
*Director of the United States Patent and Trademark Office*